(12) United States Patent
Schigel et al.

(10) Patent No.: US 8,095,408 B2
(45) Date of Patent: Jan. 10, 2012

(54) SYSTEM AND METHOD FOR FACILITATING NETWORK CONNECTIVITY BASED ON USER CHARACTERISTICS

(75) Inventors: Timothy Schigel, Cincinnati, OH (US); David E. Goldberg, Champaign, IL (US)

(73) Assignee: ShareThis, Inc., Wilmington, DE (US)

( * ) Notice: Subject to any disclaimer, the term of this patent is extended or adjusted under 35 U.S.C. 154(b) by 1207 days.

(21) Appl. No.: 11/664,710

(22) PCT Filed: Oct. 11, 2005

(86) PCT No.: PCT/US2005/036638
§ 371 (c)(1),
(2), (4) Date: Apr. 4, 2007

(87) PCT Pub. No.: WO2006/042265
PCT Pub. Date: Apr. 20, 2006

(65) Prior Publication Data
US 2008/0097822 A1    Apr. 24, 2008

Related U.S. Application Data

(60) Provisional application No. 60/617,566, filed on Oct. 11, 2004, provisional application No. 60/694,108, filed on Jun. 24, 2005.

(51) Int. Cl.
*G06Q 40/00*    (2006.01)

(52) U.S. Cl. .................................... 705/7.13; 705/7.11
(58) Field of Classification Search .................. None
See application file for complete search history.

(56) References Cited

U.S. PATENT DOCUMENTS

| | | | |
|---|---|---|---|
| 5,717,923 A * | 2/1998 | Dedrick | 1/1 |
| 6,460,036 B1 | 10/2002 | Herz | |
| 7,631,007 B2 * | 12/2009 | Morris | 1/1 |
| 2005/0071328 A1 | 3/2005 | Lawrence | |
| 2005/0222901 A1 * | 10/2005 | Agarwal et al. | 705/14 |
| 2005/0240580 A1 * | 10/2005 | Zamir et al. | 707/4 |

OTHER PUBLICATIONS

International Search Report and Written Opinion dated Nov. 28, 2006 for International Application No. PCT/US05/36638.

* cited by examiner

*Primary Examiner* — Thomas Dixon
*Assistant Examiner* — Benjamin S Fields
(74) *Attorney, Agent, or Firm* — Morgan, Lewis & Bockius LLP; Brett Lovejoy

(57) ABSTRACT

A computer system for facilitating user connectivity in a computer network includes an attention manager, an identity manager, and an introduction manager. The attention manager generates data indicative of the current interests of the user. The identity manager manages data indicative of the interests of the user. The introduction manager provides a proactive contact, content, or commerce data recommendation for the dynamic introduction of contact, content, or commerce data to the user, and may also provide bilaterally secure introductions with other users.

48 Claims, 14 Drawing Sheets

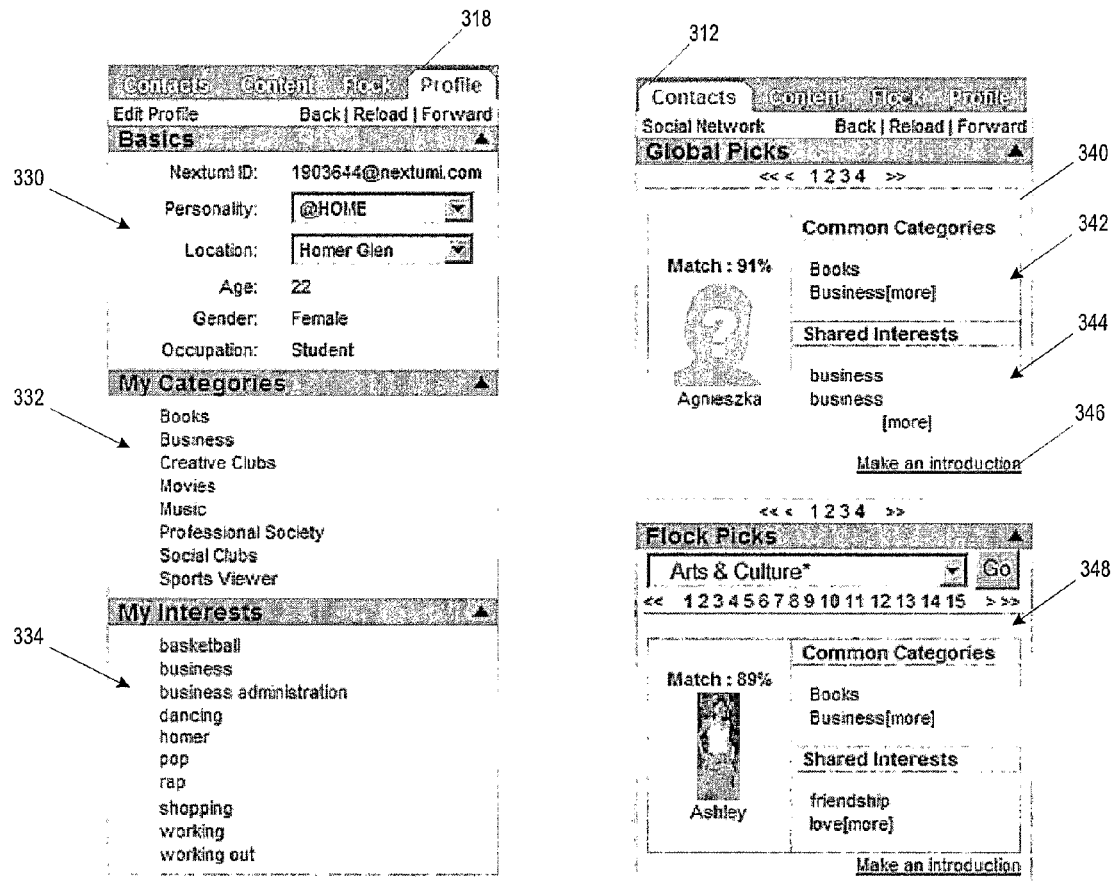
FIG. 20
FIG. 21
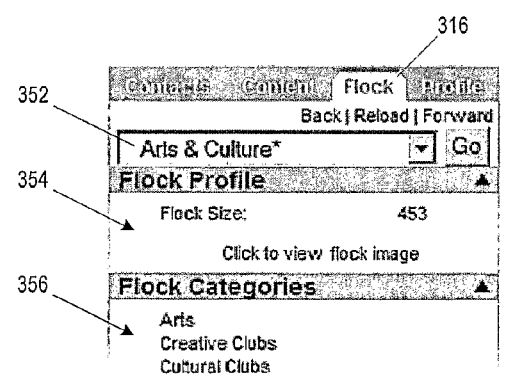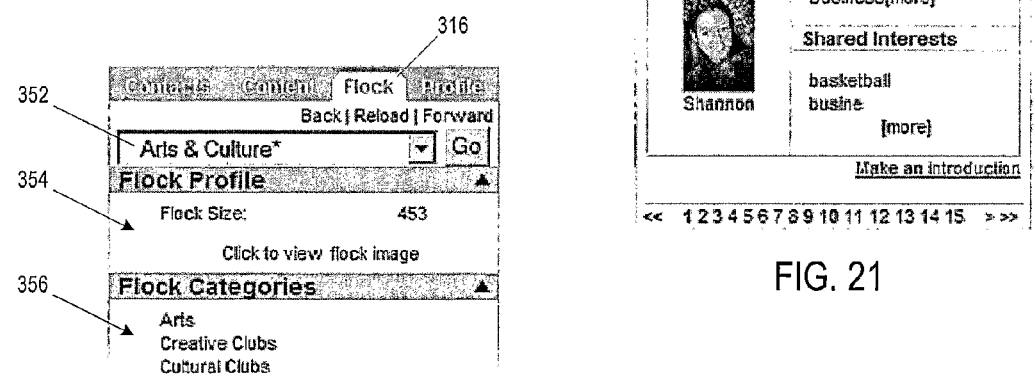
FIG. 22

SYSTEM AND METHOD FOR FACILITATING NETWORK CONNECTIVITY BASED ON USER CHARACTERISTICS

This patent application claims the benefit of priority to U.S. Provisional Application Ser. Nos. 60/617,566, filed on Oct. 11, 2004, and 60/694,108, filed on Jun. 24, 2005, the entire disclosures of which are incorporated herein by reference.

BACKGROUND AND SUMMARY

The technology described herein relates to systems and methods for determining user identity, preferences, and attention in a computer network, and for making introductions to other contacts, content, and commerce via the computer network.

Currently, individuals must search the Internet for contacts, content, and commerce of interest; that is, the individual must initiate the search to find the contact, content or commerce of interest. The exemplary systems and methods described herein, however, provide an Internet-based software system that automatically adapts to an individual's preferences, attention, and identity in order to introduce contacts, content or commerce of interest to the individual.

An example computer system for facilitating user connectivity in a computer network includes an attention manager, an identity manager, and an introduction manager. The attention manager is configured to monitor actions exhibited by a user in the computer network and to generate attention data that is indicative of current user attention, the attention data based on the monitored actions exhibited by the user. The identity manager is configured to evaluate user preference data indicative of user interests and the attention data and generate user profile data for the user based on the user preference data and the attention data, the user profile data indicative of user interests, and is further configured to adaptively update the user preference data in response to changes in user interests. The introduction manager is configured to receive the user profile data of the user and user profile data related to other users and evaluate the user profile data of the user and the user profile data related to other users and provide a bilaterally secure introduction with one or more other users based on the evaluation.

Another example computer system for facilitating the providing of contact, content, or commerce data to one or more users in a computer network includes an identity manager and an introduction manager. The identity manager is configured to monitor user actions indicative of user interests exhibited by a plurality of users in the computer network and to generate corresponding user profiles for the plurality of users based on the evaluation of the monitored actions, the user profiles indicative of user interests for the plurality of users, and is further configured to evaluate the user profiles to identify highly correlated interests among the plurality of users. The introduction manager is configured to receive a user profile of a user and evaluate the user profile against the identified highly correlated interests among the plurality of users and generate a proactive contact, content, or commerce data recommendation for the dynamic introduction of contact, content, or commerce data to the user based on the evaluation.

Another example computer system for facilitating user connectivity in a computer network includes an attention manager, an identity manager, and a plurality of interest space managers. The attention manager is configured to monitor actions exhibited by a user in the computer network and to generate attention data that is indicative of current user attention, the attention data based on the monitored actions exhibited by the user. The identity manager is configured to evaluate user preference data indicative of user interests and the attention data and generate user profile data for the user based on the user preference data and the attention data, the user profile data indicative of user interests, and is further configured to adaptively update the user preference data in response to changes in user interests. Each of the plurality of interest space managers is configured to receive the user profile data for a plurality of users and access interest subsets of the user profile data, the access to the interest subsets for each interest space manager based on a predefined interest associated with the interest space manager.

DRAWINGS

FIG. 11A is an example dependency structure matrix (DSM) of user profile data;

FIG. 11B is the DSM of FIG. 11 having identified dynamic flocks of populations of user profile data;

FIGS. 16-22 are example application windows in a computer system that facilitates user connectivity in a computer network.

DETAILED DESCRIPTION

Figure 1:
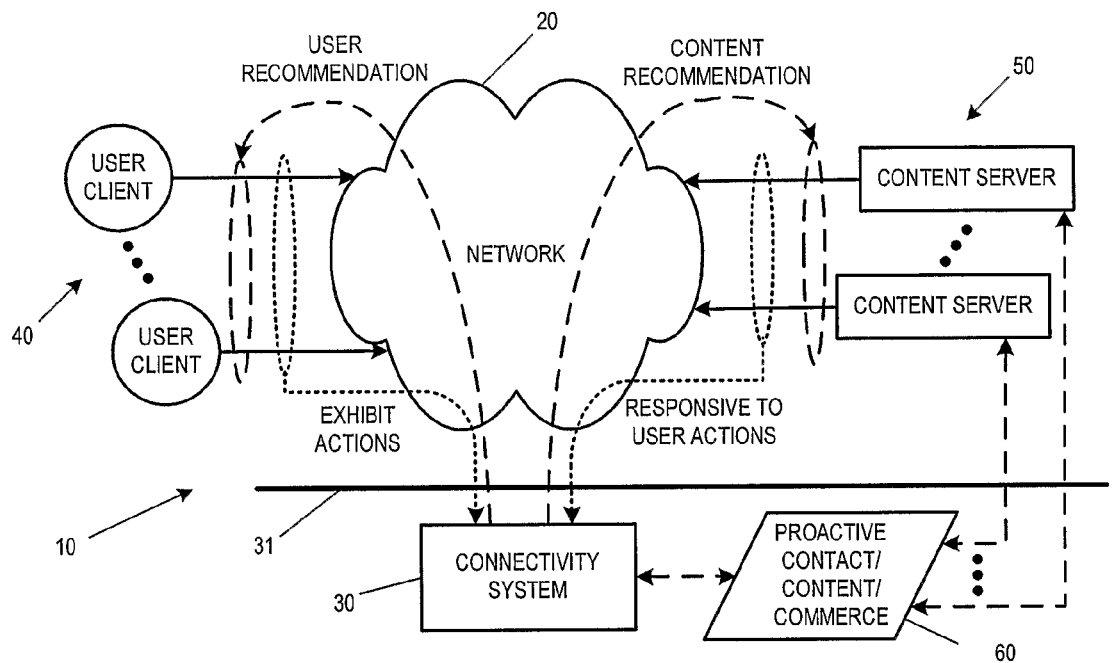
FIG. 1 is a block diagram of an example computer system for facilitating user connectivity in a computer network.

The systems and methods disclosed herein utilize user profile data that is indicative of a user's interests to facilitate user connectivity in a computer network, such as the Internet. In particular, profile data corresponding to a user is used to adaptively introduce content, contacts and commerce to the user. A user may include a person or another identifiable entity. Likewise, a contact may include another user or another identifiable entity. Content may include a uniform resource locator (URL) within a web page, or may include an entire web page, or may include specific data within a web page, or may include other content that is delivered to the user in another manner, such as by e-mail, etc. Commerce may include commerce-specific content, such as an offer to purchase a product, a URL to a product review, etc. The preceding list of example contacts, content and commerce is not exhaustive.

The underlying data of the user profile may be adaptively updated based on the user's actions to ensure that the profile data accurately reflects the user's current and/or long-term interests. Such actions may include a user's click history (i.e. mouse clicks), text searches, URL history, behavior models, or other actions indicative of a user's interests.

A variety of data structures and adaptive methodologies may be utilized to implement the systems and methods described herein. For example, the systems and methods disclosed herein may be implemented based on the metaphor of a consumer chromosome that is adapted by genetic algorithms (GAs). The system interconnects a large population of users through one or more web sites. The user is asked to input an initial profile of likes and dislikes. Thereafter, the system adapts each user's identity, current attention status, and click preference by processing a set of consumer chromosomes in an efficient manner.

As the consumer chromosomes are learned, the system creates a more accurate representation of the user's likes and dislikes. Consumer chromosomes are then used automatically by the system to match other user profiles or chromosomes to find contacts, content, or commerce that are highly likely to be of interest to the user. The adaptive system more accurately reflects what a user thinks and does, thereby creating better matches. Better matches result in better relationships, content, and opportunities to purchase useful products and services.

The data structures used to implement the systems and methods herein may also be hierarchical, extensible, and/or layered. For example, the systems and methods herein may utilize hierarchical, extensible and layered chromosomes. Such chromosomes can capture a user's interests to an arbitrary degree of detail, while still permitting efficient learning of data on a level-by-level as needed. The layering of the chromosomes may also be security based, which permits a high degree of control over what information is permitted to be disclosed to other users, thereby respecting the privacy and confidentiality concerns of the user.

Additionally, the user profile data may also be content-specific. For example, a content chromosome may be utilized to facilitate learning preferences for particular web sites. Most of a user's time during an interaction session on the computer network is spent surfing multiple web sites. Such user interaction provides a source of data that provides rapid and extensive learned preferences that, in turn, provide more rapid, accurate searches for content, contacts and commerce.

Additionally, text-mining and visualization techniques may be used to initialize consumer and content chromosomes and to extend the chromosome representation. This permits more rapid learning of preferences and provides a more detailed description of a user's preferences once an extended chromosome is created.

Behavior-based data may also be included in addition to content-based and interest-based profile data. A user's particular behavior, e.g., a model of a user's click sequence or click history with respect to content or commerce, or a probabilistic model of a user's response to an offer type, may be represented as a data structure. A content or commerce provider may access the representative data structure to adaptively present content or commerce to the user. For example, based on data related to a user's click history, a commerce provider may adaptively present an offer to a user to maximize the likelihood of the user accepting the offer. Thus, if a user's modeled behavior indicates that the user is more likely to purchase a product after reading several reviews, an offer for a product may be presented in parallel with links to several product reviews. Conversely, if a user's modeled behavior indicates that the user is less likely to purchase a product after reading several reviews, an offer for a product may be presented without links to any product reviews.

Finally, adaptation may be multi-modal. Genetic algorithms, collaborative filtering, case-based reasoning, hierarchical Bayesian optimization, and other procedures may be used to adapt the consumer chromosome to the user's behavior. Using multiple techniques provides robust adaptation with whatever quantity of data is available to induce consumer preferences.

Once the user profile data is established, an introduction manager manages an introduction process between two or more users. The introduction is managed to protect user confidentiality (secure), eliminate unwanted introductions (filtered), and only consummate introductions desired by both parties (bilateral). The introduction manager may facilitate such introductions based on public subsets of user profile data. The introduction manager may also be configured to manage the introduction of content or commerce to the user.

An identity manager manages the overall preferences, behavior and interest models of a user. The identity manager adapts user preference data based on various source data and adaptive processing techniques. For example, a user's URL history, search history, introduction acceptance or rejection history, and other types of data can be used to adapt user preference data. The URLs may be identified by characteristic content or by URL chromosomes, and these can be used to modify user preference data.

An attention manager monitors the user's behavior and generates attention data that is indicative of the user's current interests. The attention manager may use interactive query and adaptive processes to restrict or limit data searches for the user.

FIG. 1 is a block diagram of an example computer system 10 for facilitating user connectivity in a computer network 20, such as the Internet. A connectivity system 30 is in data communication with a plurality of user clients 40 and a plurality of content servers 50. The connectivity system 30 may be realized by a server computer or a plurality of distributed server computers. The user clients 40 may comprise computing devices such as a personal computer, a mobile device, a television having network connectivity and communication capability, and the like.

The connectivity system 30 is configured to generate user preference data that is indicative of a user's interests and preferences for each corresponding user of the user clients 40. Such preferences and interests may include behavioral data as well. A user may be a person or an entity, such as a business entity. The user preference data may be generated by an initial user profile filled out by a user, by data mining of data associated with the user, by monitoring the contacts, content and commerce frequented by the user, and/or by the monitoring of user behavior. Thereafter the user preference data may be adaptively updated by the monitoring of the user behavior, monitoring the contacts, content and commerce frequented by the user, and/or by continued data mining of data associated with the user, or by monitoring other actions indicative of user interests, preferences and behavior.

Portions of the user profile data may also be static and not subject to adaptive updates. For example, data relating to the user's gender, address, religion, race, etc. may be configured to only be manually updated by the user.

The connectivity system 30 also monitors the actions exhibited by the user over a predefined measurement criterion to generate attention data that is indicative of current user attention. The user actions may be monitored by monitoring the URL history associated with the user's user client 40, by monitoring click interactions exhibited by the user's client 40, and/or by natural language monitoring of text data input by the user at the user client, such as search engine parameters, e-mail messages, and the like.

The connectivity system 30 may process the attention data and the user preference data into user profile data that is indicative of one or more of user interests, preferences and behavior. The user profile data may then be evaluated and compared to other user profile data or evaluation data related thereto to facilitate the introduction of content, contacts or commerce to the user.

In one embodiment, contacts are introduced by a secure, filtered and bilateral introduction. The introduction is secured by protecting the user's confidentiality, and filtered to eliminate or preclude unwanted introductions. Additionally, introductions may only be consummated bilaterally at the desire of both parties.

In another embodiment, contact, content and/or commerce data 60 is proactively recommended to the user. The user profile of the user and other users are evaluated to identify highly correlated interests among the plurality of users. Based on the highly correlated interests, a proactive contact, content or commerce recommendation is made for the dynamic introduction of a contact, content or commerce to the user. Because the user profile is indicative of user interests and preferences and can be determined independently of any one content server 50, the contact, content or commerce may be provided by the content server 50 proactively, i.e., without any interest indicia provided by the user to the content server 50. Thus, unlike a collaborative filter that requires some initial user indicia provided by the user to the filter, e.g., the selection of several movies on a web site, the connectivity system 30 may provide a contact, content or commerce recommendation to the content server 50 at the first instance of a user's visit to the content server 50. The content server 50 may then proactively provide the contact, content or commerce for the user based on the recommendation. The connectivity system 30 may also monitor contacts, content or commerce provided by or facilitated by the content servers 50 in response to the actions of a plurality of users and proactively provide contact, content or commerce recommendations to the user based on the user's profile data.

In another embodiment, content in the form of a web page may be personalized based on the user profile data. For example, a content server 50 that provides content related to sports may generate different web pages for two different users. Thus, if the profile data of a first user indicates that the user is a baseball fan, then the content server 50 may proactively generate an index web page tailored to baseball. Likewise, if the profile data of a second user indicates that the user is a basketball fan, then the content server 50 may proactively generate an index web page tailored to basketball. Additionally, the web pages may be generated proactively.

In a variation of this embodiment, manually customized web pages may also be adaptively updated by a content server 50 based on the user profile data. For example, a web page having news, stock quotes, weather, and other features that were initially manually specified by a user may thereafter be adaptively updated by the content server 50. Thus, if a user's initial stock portfolio is displayed on a manually customized web page, and the user thereafter purchases an additional stock, the additional stock purchase may be reflected in an update of the user's profile data and the content server 50 may automatically update the user's web page based on the user profile to include a listing for the additional stock. The content server 50 need not be associated with the service provider that sold the stock to the user to automatically update the web page.

In the example system 10 of FIG. 1, the user profile data of users associated with the user clients 40 may be maintained independently of the user clients 40. For example, the users of user clients 40 may agree to have their actions over the network 20 monitored by the connectivity system 30. Identities may be maintained by identification files stored on each user client 40, such as a web browser cookie, while the storage, updating and maintaining of the user profile data may be facilitated by the connectivity system 30.

In one embodiment, the users of user clients 40 may also specify what actions may be monitored by the connectivity system 30. For example, a user may specify that only actions indicating an interest in predefined interest areas of music and finance may be monitored, while actions relating to any other predefined interest areas are to be ignored.

The monitoring of content and commerce frequented by the user may be facilitated by classifying content and commerce on the content servers 50 by category information that may be mapped to the user preference data. For example, if the user preference data includes the categories of "news" and "sports," then content and commerce on the content servers 50 may be likewise categorized under "news" and "sports" as appropriate. The classifications may be done manually or automatically. For example, the classifications may result from tagging by the content provider, tagging by a social process, by crawling and classifying by means of a text mining and information retrieval process, or from the collective user profile data of a plurality of users that visit the content server 50. In one embodiment, URL chromosomes for content and commerce are learned from updates of consumers that visit the content servers 50.

Another embodiment utilizes a data structure related to user clicks for each content server 50. User clicks may be stored for various types of data. Such click types include clicks on URLs that take the user to another web site, clicks on URLs that open a window in the same web site, clicks on content that download documents or files, clicks that yield e-mail or other user communications, clicks that accept or reject purchase offers, and the like. Based on the click histories for the various click types, probabilistic models of user responses to each click object presented to users may be created. The accuracy of the models may be increased when evaluated against the profile data of an individual user.

Figure 2:
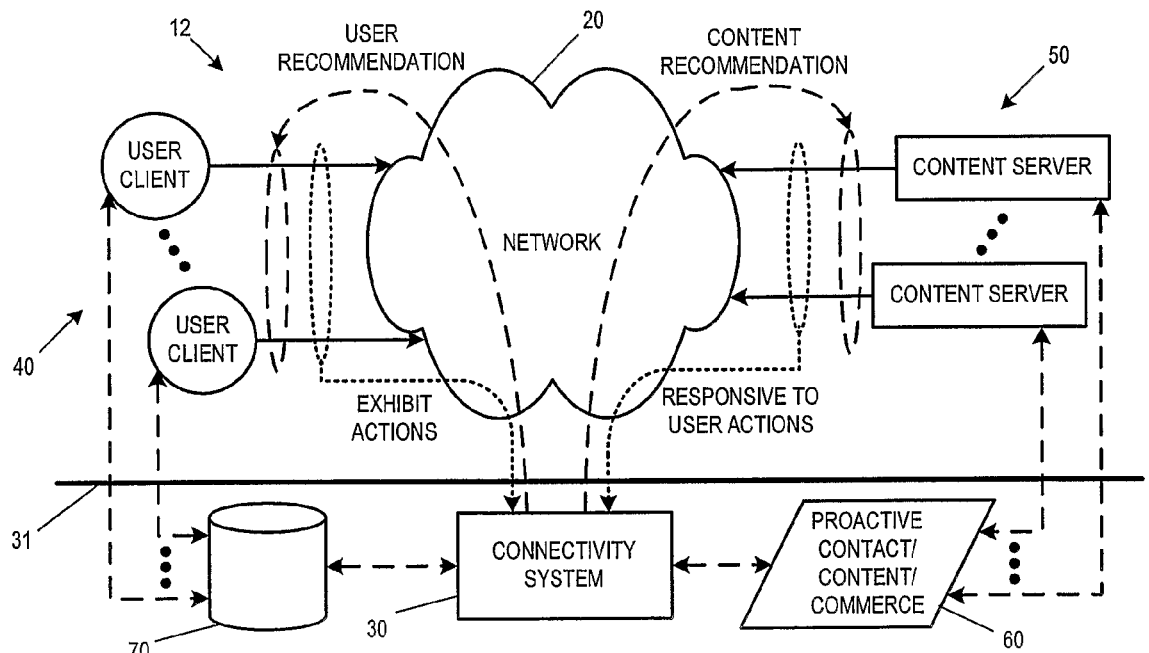
FIG. 2 is a block diagram of another example computer system for facilitating user connectivity in a computer network.

FIG. 2 is a block diagram of another example computer system 12 for facilitating user connectivity in a computer network 20. The system of FIG. 2 operates in a manner similar to that of the system of FIG. 1, except that the user profile data may be stored in a data store 70 directly accessible by the user clients 40. The user clients 40 may access the data store 70 to facilitate updating and augmentation of a user's profile data by the user. The data store 70 may be distributed, such as in the case of storing user profile data on each user client 40, or may be centrally located, such as in the case of storing the user profile data in the connectivity system 30.

The system 10 and 12 of FIGS. 1 and 2 may be offered as a service from a third party to content providers and/or users, or may be integrated into the systems of the content providers and/or users. In one example embodiment, the connectivity system 30 may be administered and run by a third party to facilitate connectivity between the content providers and users. The users and/or content providers may subscribe to receive services provided by the connectivity system 30. Users subscribing to the service have an associated user profile that may be stored either on the user client 40 or at the connectivity system 30. Content service providers subscribing to the service may have category information associated with their content servers 50 stored either at the content servers 50 or at the connectivity system 30. The behavior, preferences and interests all user and content provider subscribers across all sites may be monitored and integrated into predictive models to further facilitate connectivity between the content providers and users. In another example embodiment, each content server 50 may independently realize a connectivity system 30 and may monitor only the actions of users on its own content servers 50.

The systems 10 and 12 of FIGS. 1 and 2 may also include one or more security measures 31. In one example security embodiment, the security measures 31 include encryption of user profile data to ensure that only authorized parties have access to the user profile data. For each set of user profile data, the authorized parties may include, for example, the connectivity system 30 service provider and other third parties approved by each user.

In another example security embodiment, the security measures 31 include secure socket layer (SSL) based communications to ensure security of data transported and routed through the network 20. Thus, all introductions of content, contacts or commerce, and all proactive recommendations of content or commerce, may be securely provided to the users.

In yet another example security embodiment, the security measures 31 ensure that user profile data is not handled by third parties (e.g., parties other than the connectivity system 30 provider and each corresponding user). Instructions, recommendations, personalization, and all other user profile related actions take place via queries to the connectivity system 30 without revealing the contents of the user profile data. User anonymity may also be maintained at the user's discretion.

Figure 3:
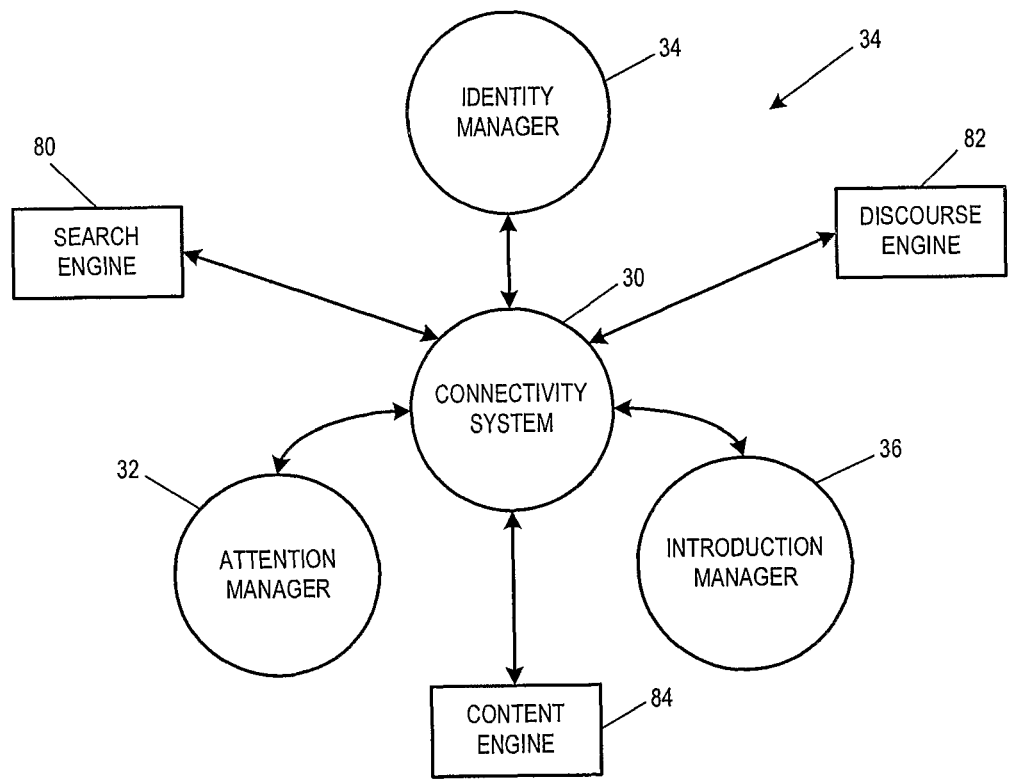
FIG. 3 is a block diagram of a connectivity system for facilitating user connectivity in a computer network.

FIG. 3 is a block diagram of a connectivity system 30 for facilitating user connectivity in a computer network. The connectivity system 30 includes an attention manager 32, an identity manager 34, and an introduction manager 36. The connectivity system 30 is devised to glean user preferences, wants, and needs from user data and user actions, such as data input and user behavior, to facilitate the functions extant applications, such as a search engine 80, a discourse engine 82 and a content engine 84 serving the user. The resulting architecture inverts a web session from a client-directed session to a user identity-directed session. In other words, the architecture of FIG. 3 places the user at the center of the web and facilitates service providers learning the detailed preferences of their consumers so that the service providers bring the user relevant contacts, content, and commerce that mesh strongly with those preferences.

The attention manager 32 is configured to monitor actions exhibited by the user in the computer network and to generate attention data that is indicative of current user attention. The attention data is based on the monitored actions exhibited by the user, and may also be based on other data related to the user, such as URL history files, e-mail messages, behavior models generated from the monitored actions, etc.

The identity manager 34 is configured to monitor actions exhibited by the user in the computer network and to generate preference data that is indicative of the user's interests, preferences and behavior. The identity manager 34 also receives the attention data from the attention manager and generates user profile data that is indicative of user's interests, preferences and behavior based on the user preference data and the attention data. The identity manager 34 is also configured to adaptively update the user preference data and profile data in response to changes in user interests.

The introduction manager 36 is configured to evaluate the user profile data of the user and the user profile data related to other users and provide a bilaterally secure introduction with one or more other users based on the evaluation. The introduction manager 36 may also be configured to evaluate the user profile data of the user against the identified highly correlated interests among a plurality of other users and generate a proactive content recommendation for the dynamic introduction of content or commerce to the user based on the evaluation.

The connectivity system 30 of FIG. 3 thus monitors user actions and user data from a variety of source data, such as user input, text data, and click behavior, and uses one or more learning algorithms, such as genetic algorithms (GAs), machine learning, and/or data mining, to construct secure and extensible user profile data.

The connectivity system 30 thus uses multiple sources of user data and user actions to drive a rapid and reliable learning process that quickly provides an adequate delineation of important areas of interest to the user. Once those areas of interest are identified, the connectivity system 30 matches user preferences, wants, and needs with corresponding preferences, wants and needs of other users, web sites, or enterprises, thereafter introducing the users to highly relevant contacts, content, or commerce.

The connectivity system 30 thus creates and maintains an adaptive model of user identity and attention to facilitate the matching of relevant commerce, contacts, and commerce to the user. The model may predict the preference or probability that some introduction, recommendation, or personalization step will be chosen or appreciated by the user, thus accurately predicting that the preference or probability is the ideal for building a user model.

The model may be realized by consumer chromosomes (e.g., vectors of preferences or probabilities), Bayesian models, fuzzy models, or other models. An example embodiment utilizes a compact genetic algorithm or probability-based incremental learning (PBIL) to capture vectors of preferences or probabilities, respectively. Other probability-based matching and/or prediction algorithms may also be used.

Figure 4:
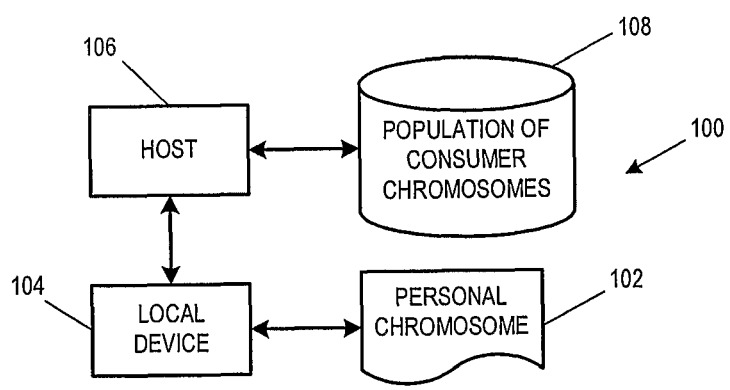
FIG. 4 is a block diagram of a single host model for storing a population of consumer chromosomes.

In this example embodiment, the user profile data comprises a consumer chromosome data structure. FIG. 4 is a block diagram of a single host model 100 for storing a population of consumer chromosomes. A user has a personal consumer chromosome 102 that may be stored on a local device 104, which may comprise a client computer, a wireless mobile device, etc. The chromosome 102 may also be stored at a host system 106, which may comprise a server computer or a plurality of distributed servers. The host system 106, in turn, stores a population of consumer chromosomes 108 whereby the preferences and interests of the user may be evaluated against the preferences and interests of multiple other users.

Figure 5:
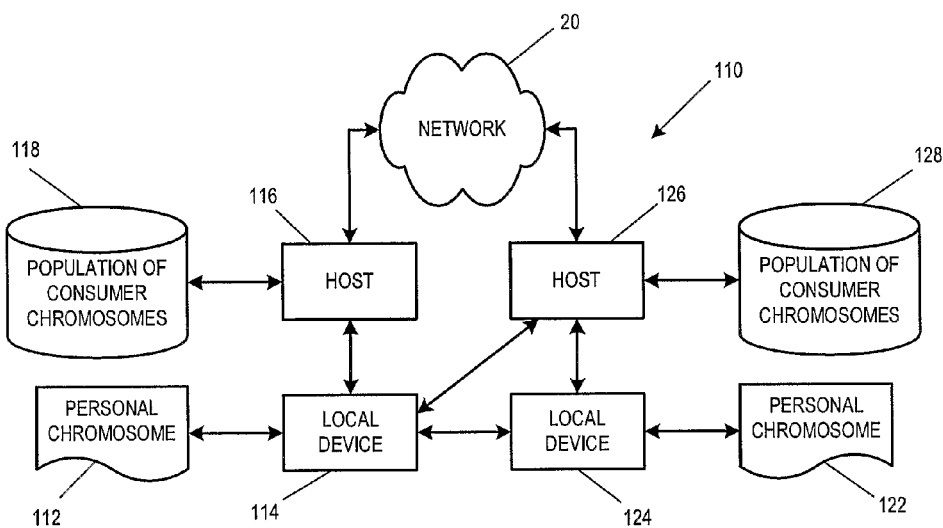
FIG. 5 is a block diagram of a multiple host model for storing populations of consumer chromosomes on a plurality of host systems and for providing peer-to-peer communication.

FIG. 5 is a block diagram of a multiple host model 110 for storing populations of consumer chromosomes on a plurality of host systems and for providing peer-to-peer communication. Users have personal consumer chromosomes 112 and 122 that may be stored on local devices 114 and 124. The chromosomes 112 and 122 may also be stored on host systems 116 and 126. The host systems 116 and 126 may, in turn, store populations of consumer chromosomes 118 and 128 whereby the preferences and interests of the users may be evaluated against the preferences and interests of multiple other users. Peer-to-peer communications, such as between the local device 114 and the host 126, or between local devices 114 and 124, may also be established. The communications may be initiated by a secured, filtered and bilateral introduction, or as the result of a contact, content or commerce being recommended to the users.

Figure 6:
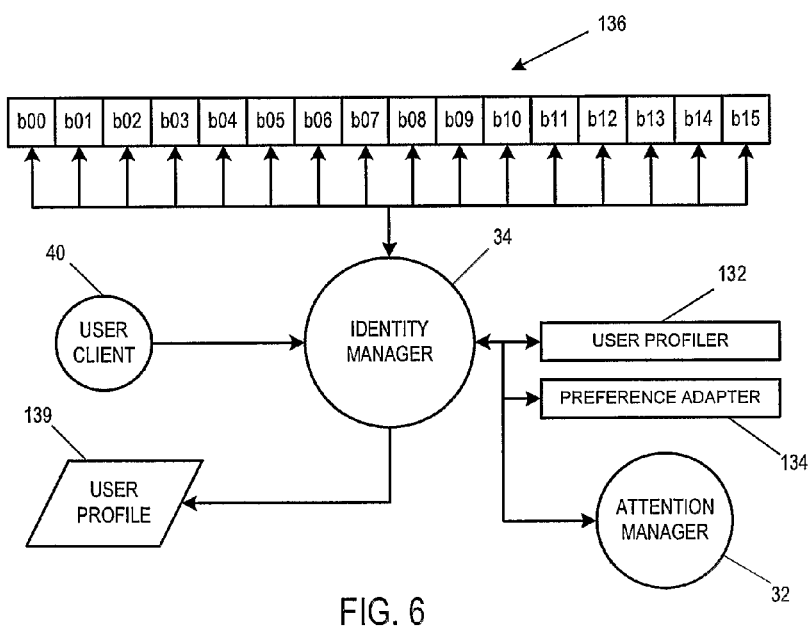
FIG. 6 is a block diagram of an example identity manager.

FIG. 6 is a block diagram of an example identity manager 34. The identity manager 34 generates and maintains user preference data 136 indicative of a user's preferences, wants, and needs. In one embodiment, the preference data 136 comprises probability metrics for use in probability-based matching and/or prediction algorithms. Generation of the preference data 136 beings with data input into a new user profile, and users may edit or augment their profile thereafter. The initial profiling process carried out in the identity manager 34 may permit the user to specify key security parameters, such as the categories of information that the identity manager 34 is permitted to learn about the user, the sources of information the identity manager 34 may use in the learning process, and what preference data the identity manager 34 may provide to other third parties or entities. This security profile and protocol may provide the user with complete control over the learning and introduction processes.

In the example embodiment of FIG. 6, a consumer chromosome data structure is used to implement the user preference data. Batch genetic algorithms and other learning algorithms are utilized to mine existing data on a user's computer or client device data store for immediate improvement in the consumer chromosome representation of the user's identity. Interactive genetic algorithms and other procedures are utilized to learn from click behavior, further refining the chromosomal representation of each user. Thus, after a relatively short time, the consumer chromosomes provide significant insight into the interests of a particular user.

The identity manager 34 may also include a user profiler 132. The user profiler 132 implements an initial profiling process for a user 40. The initial profiling process may include the user 40 answering various questions relating to the interests and preferences of the user 40, establishing security, and data mining source data. Establishing security may include defining public user profile data accessible by third parties, and defining preference sources that may be monitored for adaptively updating the user preference data. The user profiler 132 may also establish subsets of the user preference data 136 that are adaptive. Thus, the user profiler 132 may be configured to receive the user preference data 136 indicative of user interests and be further configured to receive adaptive definition data defining adaptive preferences, source definition data defining adaptive preference sources, and security information defining security protocols.

The identity manager 34 may also include a preference adapter 134. The preference adapter 134 is configured to modify the user preference data 136 based on the monitoring of the adaptive preference sources and to adaptively update the user preference data 136 in response to changes in user interests. The adaptive preference sources may comprise data stored on a client computer associated with the user, click behavior exhibited by the user, text data input by the user, or other data sources or actions indicative of the user's interests and preferences.

Figure 7:
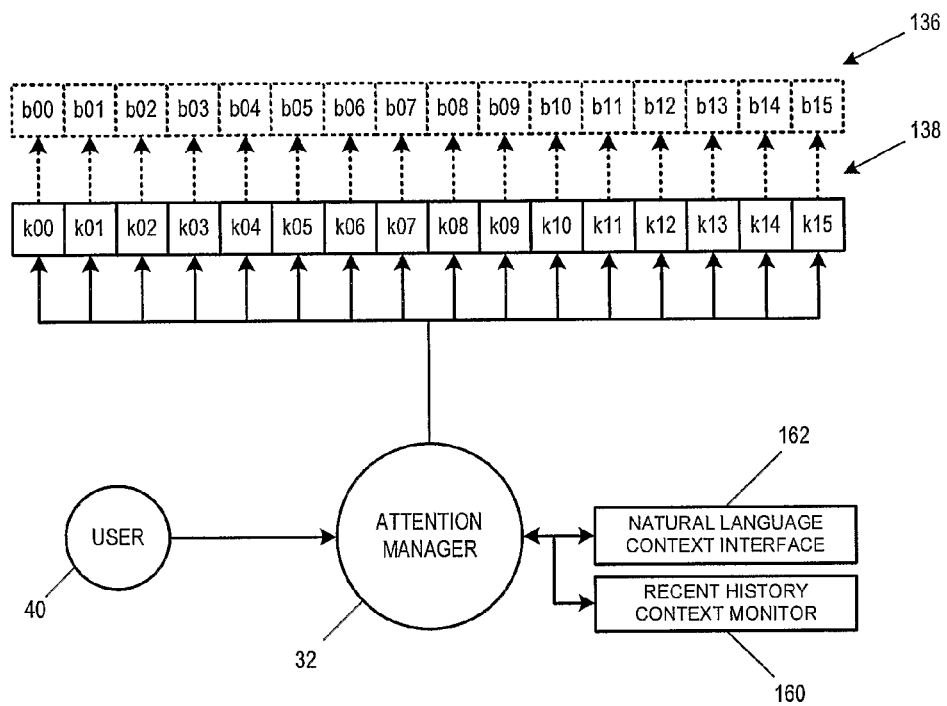
FIG. 7 is a block diagram of an example attention manager.

The identity manager 34 may also receive attention data 138 indicative of a user's current interests from the attention manager 32 of FIG. 7, and be configured to generate user profile data 139 based on the attention data 138 and the preference data 136. Portions of the user profile data 139 may also be static and not subject to adaptive updates. For example, data relating to the user's gender, address, religion, etc. may be configured to only be manually updated by the user.

In another example embodiment, separate preference data 136 may correspond to different user models based on different sources of data, resulting in multiple sets of user profile data 139. For example, profile data learned from URL clicking may be stored as a first user profile; profile data learned from acceptances or rejections may be stored as a second user profile; and profile data learned from purchases may be stored as a third user profile. The separate profile data may be used to create separate user models, such as behavior-based models, interest-based models, and content-based models.

The user profile data 139 may be provided to the connectivity system 30 of FIG. 1 or 2 for evaluation and analysis against other user profiles. The user profile data 139 may be provided automatically or subject to the user's approval. In one embodiment, a toolbar or similar type of module may be downloaded and reside on a user client 40. That module may send user profile data 139, such as click history profile data, for example, periodically to the connectivity system 30 for further analysis.

In another embodiment, content providers may provide the connectivity system 30 access to their content servers 50 web logs and cookies. The web logs and cookies can be analyzed to identify different users and track the users across sessions through cookie analysis and identify URL content and visitation patterns. A same user across different content servers 50 may be identified by cross-referencing cookies across sites and correlating a match.

In yet another embodiment, users may be identified by a unique identifier. The users may have the option of maintaining anonymity, but may alternatively identify themselves to the connectivity system 30 through a login ID and password. The identification and login method may be used to permit different users to use and maintain different identities on the same client 40. Thus, user profile data 139 for multiple users using the same client 40 may be processed by the connectivity system 30.

FIG. 7 is a block diagram of an example attention manager 32. While the identity manager 34 is responsible for generating preference data 136 related to the user's overall, long-term interests, the attention manager 32 is responsible for identifying more current, short-term interests of the user. Recent search results, database queries, click behavior and other user actions or user data may be monitored to identify the user's current interests. These current interests are used to filter or mask the user preference data 136 to determine what contacts, content, and/or commerce might be most beneficial at the moment.

The attention manager 32 is configured to monitor actions exhibited by the user to generate attention data 138 that is indicative of current user attention and based on the monitored behavior exhibited by the user. In one embodiment, the attention data 138 may comprise mask data configured to mask select portions of the user preference data 136. The mask data is updated to select portions based on the current user attention. For example, if preference data 136 fields $b14$ and $b15$ represent theology and humor, respectively, and the user has been conducting recent searches and visiting web pages related to theology, then the attention data 138 fields $k14$ and $k15$ may be set to 1 and 0, respectively. The mask data may also be weighted. For example, when a user initiates an interaction session, such as opening a web browser, the attention data 138 fields may all be set to default values of 1. Over time, however, as the user exhibits a current interest in theology, the remaining attention data 138 fields k00-k13 and k15 may gradually decrease in value from 1 to 0.

In one example embodiment, the attention manager 32 comprises a recent history monitor 160 and a natural language monitor 162. The recent history monitor 160 is configured to monitor user actions in the computer network over a predefined measurement criterion. The predefined measurement criterion may be a predefined time period or one or more recent web browsing sessions. These user actions may include click interactions, such as click selections, and URL interactions, such as the URL's of web pages visited by the user.

The natural language monitor 162 is configured to monitor natural language data input by the user over the predefined measurement criterion. The sources of natural language data input may search engine parameters, e-mail messages, and the like.

The attention manager 32 generates the attention data 138 based on the monitored actions exhibited by the user, such as click interactions, URL interactions, and natural language data input. The attention data 138 may be provided to the identity manager 34 for inclusion into the user profile data 139.

Figure 8:
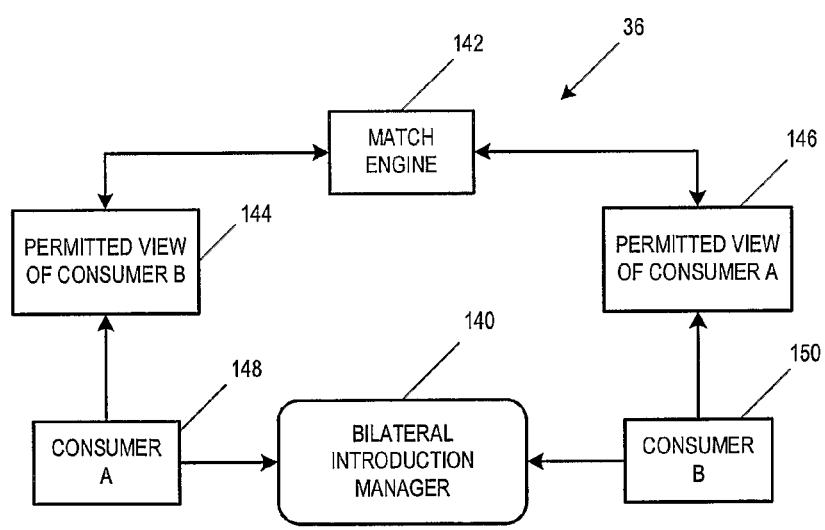
FIG. 8 is a block diagram of an example introduction manager.

FIG. 8 is a block diagram of an example introduction manager 36. The introduction manager 36 evaluates the profile data of a user against one or more other users or content to identify high-value matches to other contact, content, and commerce profile data. The identified contacts, content, and commerce have a high probability of being highly relevant to a particular user. In the case of user-to-contact matches (e.g., person-to-person), the introduction may be bilaterally secure, requiring both the user and the contact to grant permission before the actual introduction occurs. User-controlled layers of permission may be included in the introduction manager 36 to permit controlled revelation of user profile data to different classes of users or content servers 50. Introductions may also be subject to multiple layers of filtering and blocking to ensure that only the most relevant contacts, content and commerce are identified.

In one example embodiment, the introduction manager 36 includes a bilateral introduction manager 140 and a match engine 142. The match engine 142 is configured to receive user profile data 144 and 146 defined as public user profile data of user profile data 150 and 148, and to evaluate the public user profile data 144 and 146 to identify a match in interests or preferences. The bilateral introduction manager 140 is configured to provide the bilaterally secure introduction between users.

Figure 9:
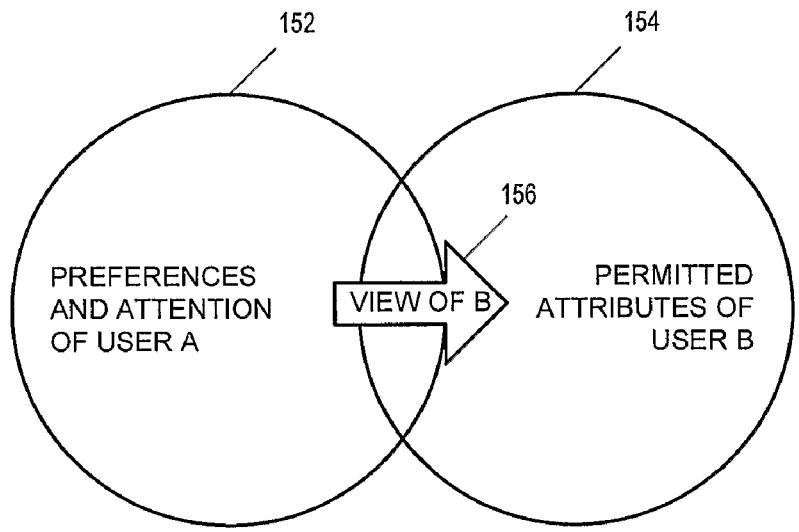
FIG. 9 is a block diagram depicting the allocation and viewing of public user profile data.

FIG. 9 is a block diagram depicting the allocation and viewing of public user profile data. Region 152 is representative of the preferences and current attention of user A, and region 154 is representative of the attributes of user B as defined by the public user profile data of user B. The introduction manager 36 thus has a "view" 156 of user B defined by the region 154. Based on the view 156 of user B, the introduction manager 36 can determine whether there is a high-value match to the preferences and current attention of user A. Thus only those permitted attributes that form the basis for a potential relationship are viewable to the other party. These permitted attributes are a subset of the user profile that the user has elected to reveal.

Figure 10A:
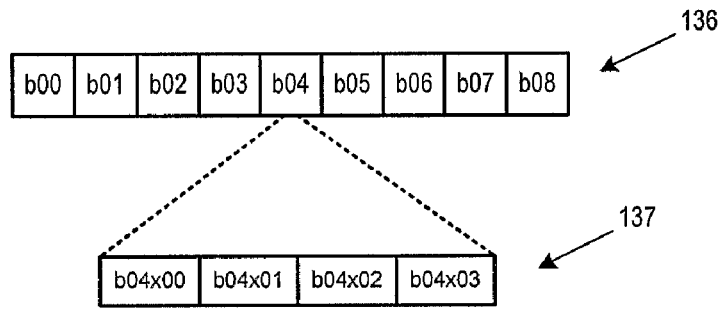
FIGS. 10A and 10B are block diagrams of example embodiments of user profile data.

FIG. 10A is a block diagram of another embodiment of user preference data 136 that includes expansion data. A particular field in the user preference data 136 may be expanded to comprise multiple sub-fields. For example, if field b04 of the user preference data 136 represents the category of academics, expansion data 137 may include related sub-fields of math, business, humanities, and psychology. While only one expansion level is shown in FIG. 10, additional expansion levels may also be implemented. In a variation of this embodiment, the expansion data 137 may also be modified by the attention data 138.

Figure 10B:
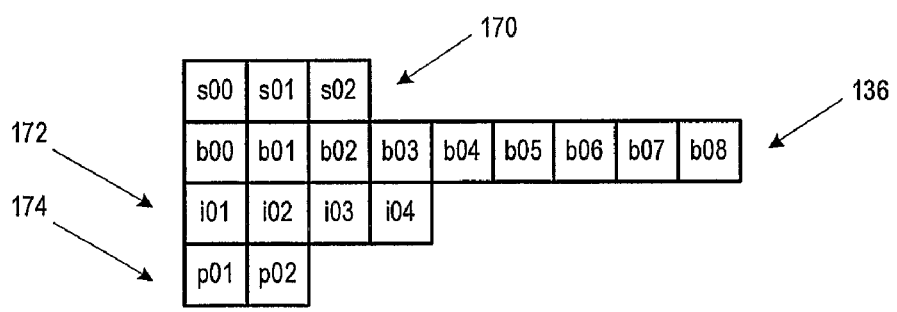

FIG. 10B is a block diagram of another embodiment of user preference data 136 that includes preference data 136, static data 170, specific interest data 172, and proximity data 174. In this embodiment, the preference data 136 may also comprise expansion data 137 as described with respect to FIG. 10A.

The static data 170 is not subject to adaptive updates, and includes data that is not likely to change. For example, data relating to the user's gender, address, and religion may be stored in fields s00, s01, and s02, respectively, and may be configured to be manually updated by the user.

The specific interest data 172 includes data relating to specific detailed interests for that user. The specific interest data 172 may be dynamically added or deleted either by an initial user profiling process and/or by monitoring the user's actions, source definition data, and adaptive preference data. For example, a user may have a specific interest in in-line skating that is identified either by the user's actions or by the user manually entering this category as a specific interest. Because interest in this field is narrow and particular, it is not included as a specific field in the preference data 136 for all users. Thus, the specific interest data 172 may include one or more fields related to in-line skating, e.g., field i01 may comprise a text string "in-line skating;" field i02 may comprise a list of particular in-line skating web site URLs, and field i03 may comprise a list of in-line skate manufacturers or brands. Field i04 may include data related to some other user-specific interest.

The proximity data 174 includes data relating to the proximity of the user. For example, field p01 may include data related to the user's proximity as indicated by a mobile station (e.g., a mobile computing device with data and/or voice communication capability) associated with the user, and field p02 may include global positioning system (GPS) data related to the user's physical location.

The static data 170, specific interest data 172, and the proximity data 174 may be utilized to further facilitate the introduction of contacts, content or commerce to the user. For example, the specific interest data 172 may be utilized to facilitate the introduction of contacts, content or commerce related to the specific interests of the user, and the proximity data 174 may be utilized to facilitate the introduction of proximate contacts, content or commerce to the user. Thus if the user of a mobile device is searching the Internet for in-line skating information, and the specific interest data 172 and the proximity data 174 indicate that there is an in-line skating vendor of particular interest to the user in close proximity to the user, then the connectivity system 30 may provide to the user a specific contact, content or commerce introduction related to the vendor.

In the example embodiment of FIG. 10B, probability-based matching and prediction is based only on the preference data 136. Matching metrics include Euclidean metrics among the preference data and Hamming metrics among the specific interest data 172. In another embodiment, the static data 170, specific interest data 172, and the proximity data 174 may also include probability data to further facilitate probability-based matching and prediction.

The data structure of FIG. 10B facilitates the introduction of contacts, content and/or commerce to the user based on one or more matches to the preference data 136, the static data 170, the specific interest data 172, and the proximity data 174.

For example, an introduction of contacts, content and/or commerce to the user, or the classification of the user as belonging to one or more identifiable groups of users having common interests, may be based on a direct comparison of preference data 136, a direction comparison of specific interest data 172, by statistical grouping of the user to other users based on the preference data 136, by correlation of the user's observed behavior to other users (e.g., click history interactions), or by any combination thereof.

A user may also be associated with profiles that are data-specific. In one embodiment, a user be associated with a static profile, a preference profile, a specific interest profile, and a proximity profile. The static profile is based on the static data 170, the preference profile is based on the preference data 136, the specific interest profile is based on the specific interest data 172, and the proximity profile is based on the proximity data 174. These profiles may be handled either collectively or separately by the connectivity system 30. For example, a user's inclusion or exclusion from an identified flock may be based on all of the data-specific profiles, or may be based on only one or more of the data-specific profiles. In another embodiment, a user may be associated with separate profiles that are content based, behavioral based, and interest based. Other separate profiles may also be used.

Figure 10C:
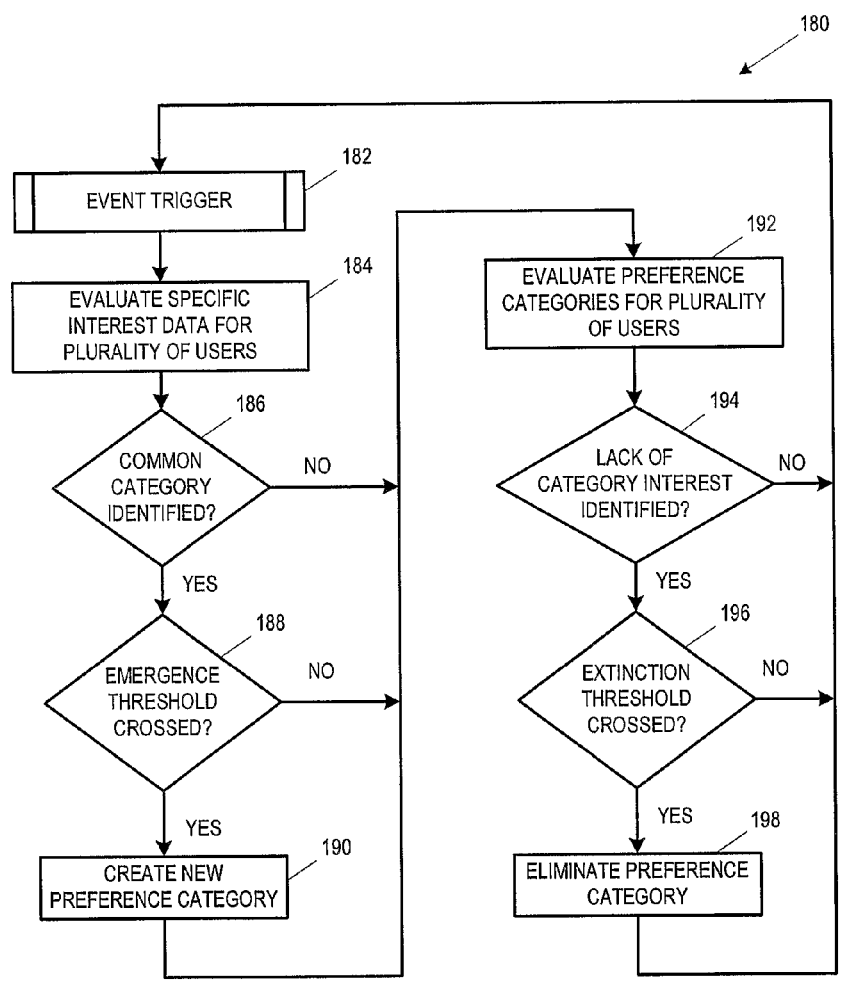
FIG. 10C is a flow diagram for an example process for identifying an emerging preference category and for identifying an extinct preference category.

FIG. 10C is an example flow diagram for a process 180 of identifying an emerging preference category and identifying an extinct preference category. The preference data 136 defines a set of preferences that are associated with all users of the connectivity system 30. Typically a large number of users may be represented by a finite set of preferences. However, as the social structure changes over time, so may change the finite set of preferences. New interests emerge and existing preferences become extinct. Thus, a set of preferences that adequately represents the interests, wants and needs of all users today may not adequately represent the interests, wants and needs of all users a year from today. The process 180 of FIG. 10C thus modifies the preference data 136 by creating new preference categories for emerging preferences from the specific interest data 172 and eliminating old preference categories from extinct preferences in the preference data 136.

The process 180 begins at step 182, which monitors for an event trigger. The event trigger may be the occurrence of a periodic time, e.g., a weekly period, or may be based on metric related to changes in the existing user preference data 136 or specific interest data 172.

Step 184 evaluates the specific interest data 172 for a plurality of users. One or more metrics related to the specific interest data 172 may be measured in step 184.

Thereafter, step 186 determines if a common interest category has been identified. A common interest category may be identified based on the one or more metrics obtained from step 184. If a common interest category has not been identified, then the process proceeds to step 192.

If, however, a common interest category has been identified, then step 188 determines if an emergence threshold has been crossed. The emergence threshold may comprise a metric associated with the identified common interest category, e.g., a duration of time that the identified common interest has existed, or a metric related to the strength of the interest in the identified common interest category, etc. If the emergence threshold has not been crossed, then the process proceeds to step 192.

If, however, the emergence threshold has been crossed, then step 190 creates a new preference category for the preference data 136. For each user, the new preference category is assigned a value or initialized with the appropriate data that is indicative of the user's interest. Thus, for those users that had specific interest data 172 related to the new preference category, the new data field in the preference data 136 is initialized with data based on the specific interest data 172. Conversely, for those users that had no specific interest data 172 related to the new preference category, the new data field in the preference data 136 is initialized with data indicative of a lack of interest by those users or an estimated interest based on the preference data 136 and the specific interest data 172. The specific interest data 172 corresponding to the new preference category may thereafter be deleted.

Thereafter, step 192 evaluates the preference data 136 for a plurality of users. One or more metrics related to the preference data may be measured in step 192.

Step 194 then determines if a lack of category interest has been identified. A lack of category interest may be identified based on the one or more metrics obtained from step 192. If lack of category interest has not been identified, then the process waits for the next event trigger in step 182.

If, however, a lack of category interest has been identified, then step 196 determines if an extinction threshold has been crossed. The extinction threshold may comprise a metric associated with the identified preference category, e.g., a duration of time that the lack of interest has existed, or metric related to the strength of the lack of interest in the category, etc. If the extinction threshold has not been crossed, then the process waits for the next event trigger in step 182.

If, however, the extinction threshold 196 has been crossed, then step 198 eliminates the corresponding preference category for the preference data 136. For each user, specific interest data 172 may be created that is indicative of the user's interest in the extinct category. Thus, for those users that had an interest in the extinct category, specific interest data 172 is created and initialized with data based on the now extinct preference data 136. Conversely, for those users that had no interest in the now extinct category, specific interest data 172 is not created.

Figures 11A, 11B:
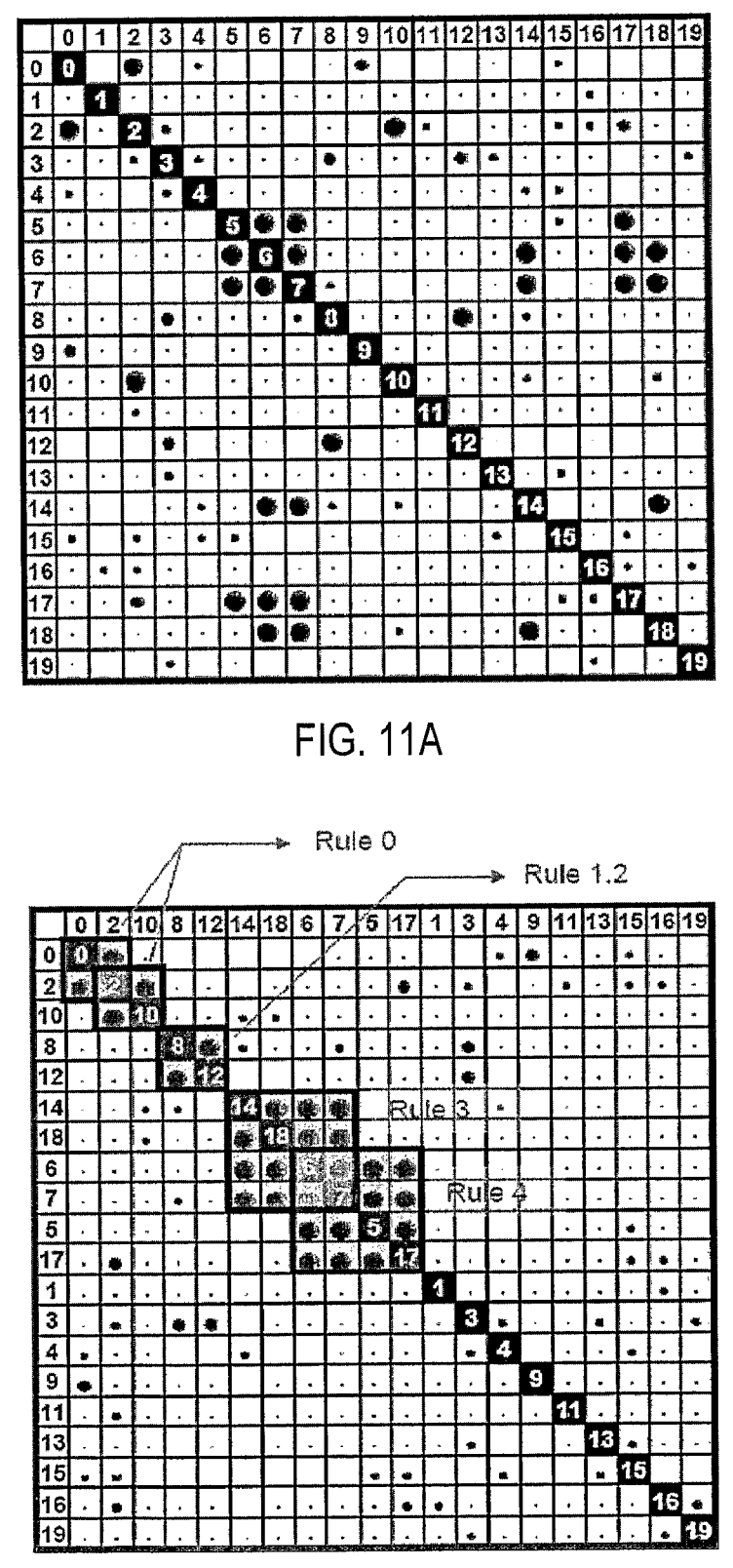
Figure 12:
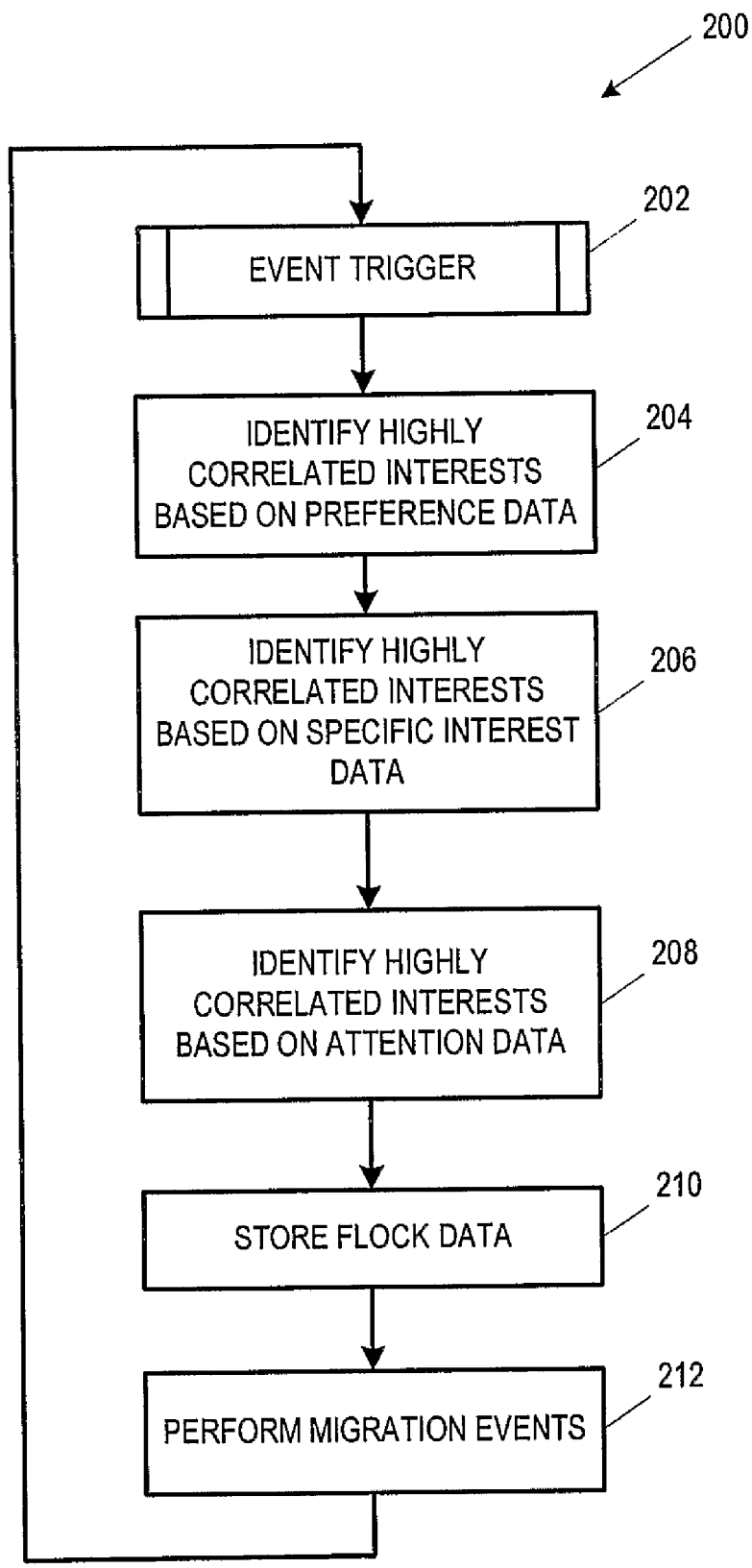
FIG. 12 is a flow diagram for an example process for identifying flocks based on the user profile data.

FIG. 11A is an example dependency structure matrix (DSM) of user profile data, and FIG. 12 is the DSM of FIG. 11 having identified flocks of populations of user profile data. The DSM of FIG. 11 may be analyzed using clustering techniques to identify clusters or flocks indicative of highly correlated interests. The flocks of FIG. 11B, for example, are identified by particular rule defining common interests, and are a dynamic and extensible representation of users with common interests. While DSM algorithms are used in the example embodiment of FIGS. 11A and 11B, other algorithms for identifying common interests may also be used, such as k-means clustering, hierarchical clustering, and the like.

Additionally, the clusters may also identify mutually exclusive or minimally interactive clusters. One example clustering technique is described in U.S. patent application Ser. No. 10/774,676, entitled "Methods and Program Products for Optimizing Problem Clustering," filed on Feb. 9, 2004, the disclosure of which is incorporated herein by reference. Other data analysis techniques may also be used to analyze and evaluate the user profile data, including the systems and methods described in U.S. patent application Ser. No. 10/051,317, filed on Jan. 18, 2002, and entitled "Method for Optimizing a Solution Set," and U.S. Patent Application Ser. No. 60/578,688, filed on Jun. 10, 2004, the disclosures of which are incorporated herein by reference.

FIG. 11B illustrates the identified flocks at a given time. Because user interests change over time, the identified flocks likewise change over time as well. FIG. 12 is an example flow diagram of a process 200 for identifying flocks over time based on the user profile data. The process 200 begins at step 202, which monitors for an event trigger. The event trigger may be the occurrence of a periodic time, e.g., a weekly period, or may be based on metric related to changes in the existing user preference data 136 or specific interest data 172.

Step 204 identifies highly correlated interests based on the preference data 136. The identified highly correlated interests in step 204 may define flocks related to the long term interests of the users.

Step 206 identifies highly correlated interests based on the specific interest data 172. The identified highly correlated interests in step 206 may define flocks related to the specific interests of the users.

Step 208 identifies highly correlated interests based on the attention data 138. The identified highly correlated interests in step 208 may define flocks related to the current attention of the users.

Step 210 stores the identified highly correlated interests from steps 204, 206 and 208 as flock data. The flock data may be used to introduce contacts, content or commerce to the users, or may be used to generate proactive content or commerce recommendations.

Step 212 performs migration events. A migration event occurs when there is a change to a flock structure. A user's account or other related data may be changed in response to the user's migration from or to a flock. For example, a user may have an account on a connectivity system 30 server that lists all flocks that the user belongs to, and these flocks are displayed on a user's account web page. As a result of a migration, the list of displayed accounts on the associated web page may change.

Likewise, proactively generated content may also change. For example, if a user having an interest in in-line skating injures his or her knee and requires arthroscopic surgery, the user may thereafter develop a strong interest in arthroscopic surgery and rehabilitation. Provided there are other users having similar interests, the user may migrate into one or more flocks related to arthroscopic surgery and rehabilitation. As a result, proactive content related to arthroscopic surgery and rehabilitation may be generated and recommended to the user as long as the user remains in the flocks related to arthroscopic surgery and rehabilitation.

In another embodiment, the system may include a plurality of interest space managers. Each interest space manager may be configured to receive the user profile data for a plurality of users and access interest subsets of the user profile data. The access to the interest subsets for each interest space manager may be based on a predefined interest associated with the interest space manager. For example, each of the content servers 50 of FIG. 1 may be configured as interest space managers for particular interests, e.g., a first content server 50 may be configured as a Humor-space manager, and a second content server 50 may be configured as a Theology-space manager. Accordingly, the Humor-space manager would be configured to access the preference data 136 field b15, which pertains to humor, while the Theology-space manager would be configured to access the preference data 136 field b14, which pertains to theology.

In another embodiment that utilizes a consumer chromosome data structure, the consumer chromosome may be served by a distributed series of strand servers (S-servers) that form a virtual chromosome space (C-Space). Chromosomes interacting in C-Space provide different opportunities for their associated users. For example, new friends meet in a Friendspace (F-Space); business contacts meet in a Bizspace (B-space); dating services are provided in a Matchspace (M-Space); purchases are made in a Mallspace (L-Space), etc. Security controls also facilitate utilization of the consumer chromosome to permit businesses to target advertising toward selected users. Other consumer marketing opportunities may also be realized through the use of the consumer chromosome.

An example consumer chromosome data structure may comprise a full genotype of 15 chromosomes directed to the following interests and preferences:

1. Basic personal information;
2. Appearance and voice information (picture, voice sample, etc.);
3. Credit status and financial information;
4. Occupation;
5. Social contacts and friend/mate preferences;
6. Hobbies;
7. Religious/spiritual beliefs;
8. Political affiliations;
9. Media preferences;
10. Reading preferences;
11. Music preferences;
12. Fashion interests;
13. Home furnishing interests;
14. Automotive preferences; and
15. Travel preferences.

The data fields used to store each interest or preference may comprise different types of stored data. For example, the basic personal information may comprise text, while the appearance of voice information may comprise a jpeg file and a mpeg file, respectively.

The chromosome data structure may be a layered and extensible structure. Layering implements security and limits information access in accordance with user preferences. For example, a top layer is open to all other members of the C-Space, while lower layers are increasingly restricted according to the security preferences of users.

Making the chromosome extensible allows for additional information to be added to extant chromosomes. Additionally, as new categories are needed, additional chromosomes can be added to the genotype. Thus chromosomes may be adapted to grow or diminish to meet the data representation need of the C-Space.

Chromosomes may be created interactively by new C-Space members on their web browsers through a sign up and profiling process. Required information is minimized; however, additional information can be provided by a user by providing optional information. Once an interest for a user is identified, the system can be configured to query the user for additional information related to the corresponding chromosome(s) of that user.

Once the user's chromosome has been established, a variety of means are used to adapt chromosomes to user preferences. The adaptation techniques implemented may depend on whether the preferences are actual preferences or the specification of ideals. In particular, Bayesian belief networks may be used to model actual user probability distributions. Alternatively, if the chromosome specifies a desired ideal, an interactive genetic algorithm may be used to the probability distribution or discrete set of ideals desired.

Commercial data may be exchanged in C-space via a standard Business Data Exchange Protocol (BDXP). The BDXP includes standard identifiers (e.g., ISBN numbers, standard UPC codes, etc.), quantity, price, data, time, vendor, and other relevant business information. In addition, C-certified firms may choose to provide historical purchase data to the connectivity system for each transaction. The connectivity system may then process the historical purchase data to improve the accuracy of commerce recommendations.

Thus in C-Space, consumer chromosomes are utilized to implement extensive, extensible, and adaptive models of user behavior. These models can then be implemented to match the user to new contacts, content or commerce.

An interests space (X-space), such as Friend-space, may be managed by a generalized messaging, chat, blogging, e-mail, and conferencing systems. The user profile and subsequent user preferences dictates a set of specifications for the search for other users having matching interests. These are used to search the database of C-chromosomes for user meeting specifications. The user meeting specifications may be either as defined or as adapted. Once a candidate for contact has been identified, a set of contact filters is used to screen contact initiators. The filters are setup in the profile and also adapt to user specifications and interests.

Interactive genetic algorithms allow users to search directly through the C-Space or by specifying the ideal interest match and then searching for close matches to the ideal. For example, a user may generate an image of an ideal friend or mate, and then search the web for an individual meeting of that ideal.

Chance discovery and keygraphs may be implemented to assist users in analyzing their discourse by showing the relationships among co-occurring terms. Such analysis may be applied to extant e-mail, conference, or chat systems. In addition, with the existence of this kind of textual analysis, influence diffusion methods may be used to analyze who influences whom. Such analysis is useful in identifying thought leaders, candidates for market research, and online focus groups. Influence diffusion data may be used as source data for dependency structure matrices and clustered using clustering algorithms and thereby generate recommendations for the formation of groups of users with common interests. One example chance discovery and keygraph technique is described in U.S. patent application Ser. No. 11/119,636, entitled "Methods and Systems for Computer Based Collaboration," the disclosure of which is incorporated herein by reference.

Figure 13:
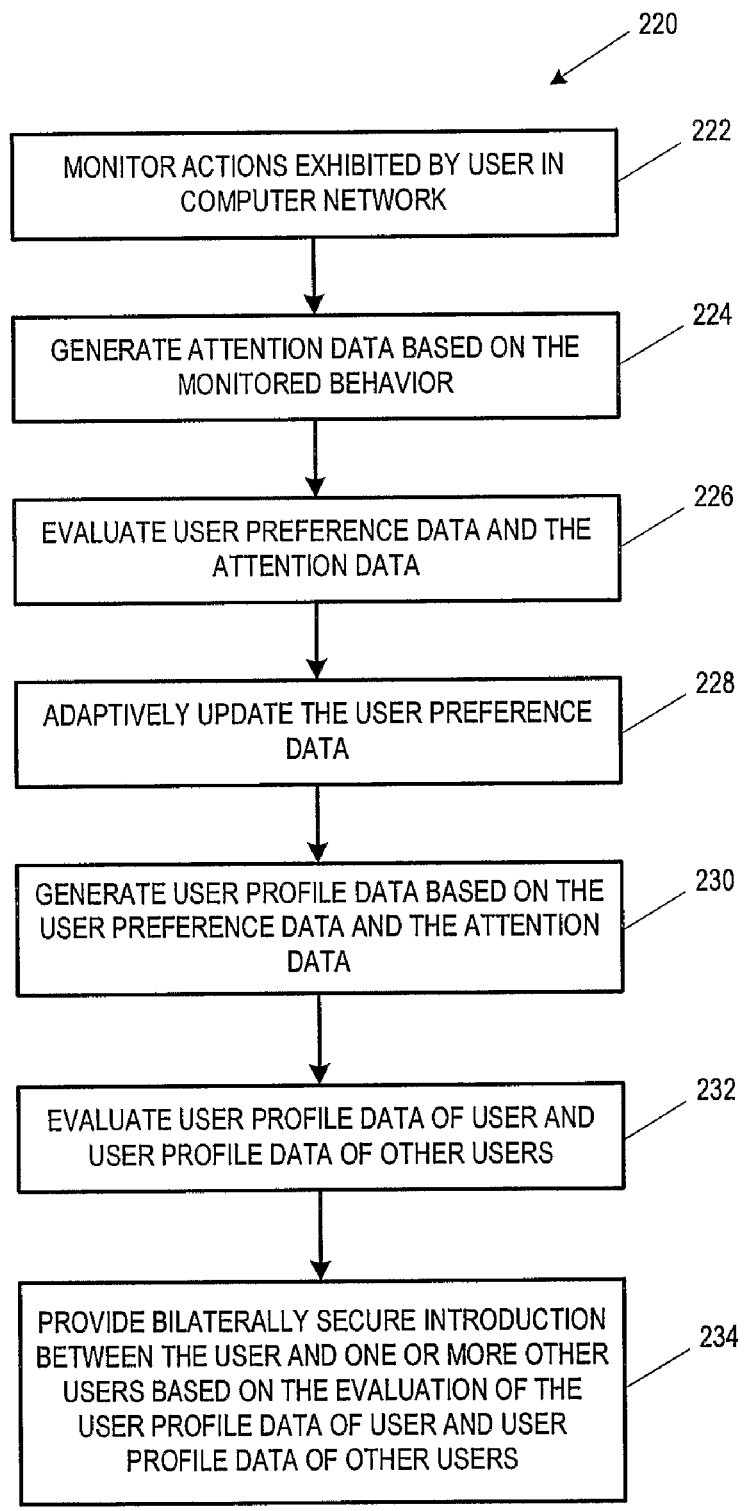
FIG. 13 is a flow diagram for an example process for facilitating user connectivity in a computer network via bilateral introduction.

FIG. 13 is an example flow diagram 220 for facilitates user connectivity in a computer network via bilateral introduction. In step 222, the actions exhibited by a user in the computer network are monitored. In step 224, attention data indicative of current user attention and based on the monitored actions is generated. In step 226, user preference data indicative of user interests and the attention data is evaluated. In step 228, the user preference data is adaptively updated in response to changes in user interests. In step 230, user profile data for the user based on the evaluation of the user preference data and the attention data is generated. The user profile data is indicative of user interests. In step 232, the user profile data of the user and user profile data related to other users is evaluated. In step 234, a bilaterally secure introduction with one or more other users based on the evaluation of the user profile data of the user and user profile data related to other users is provided.

Figure 14:
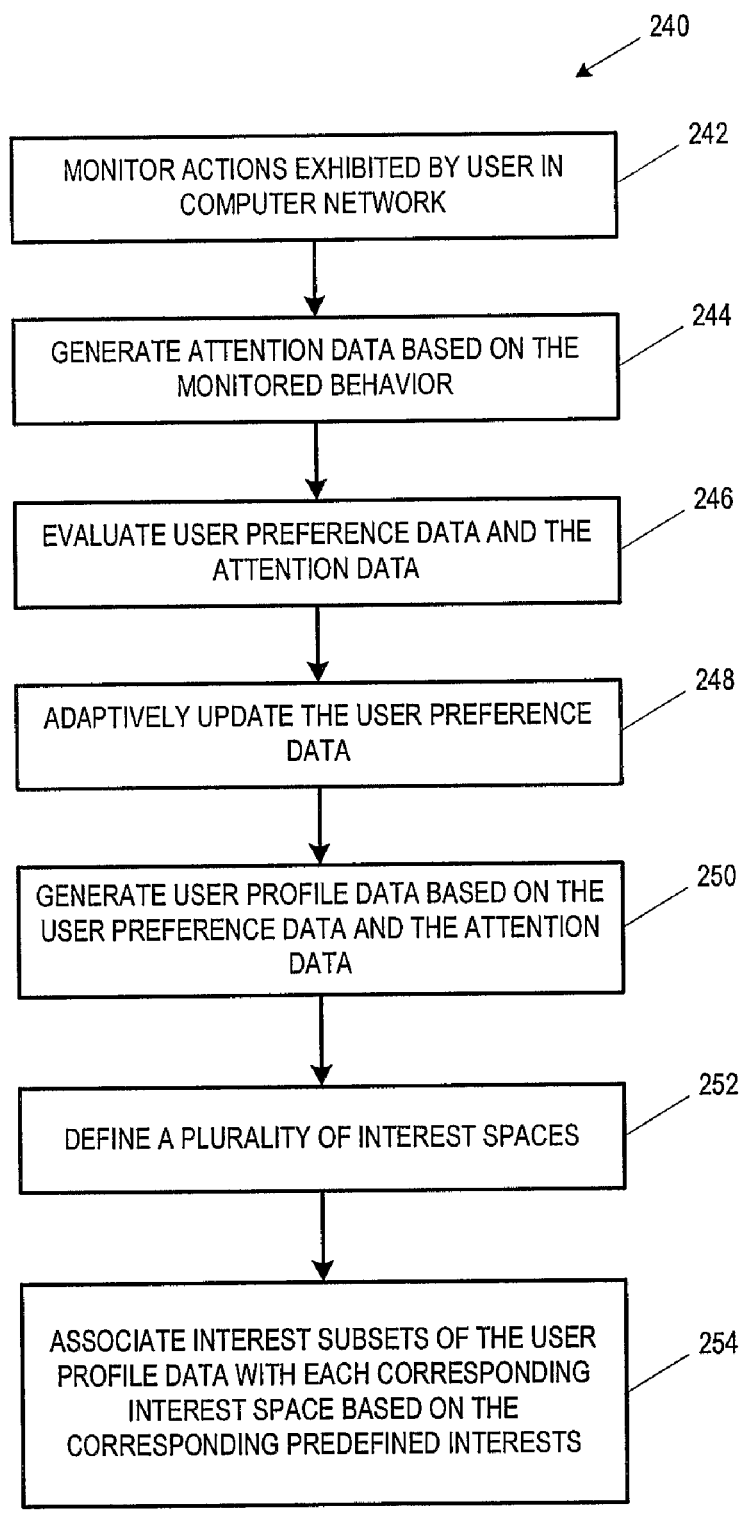
FIG. 14 is a flow diagram for an example process for facilitating user connectivity in a computer network via a plurality of interest spaces.

FIG. 14 is an example flow diagram 240 for facilitates user connectivity in a computer network via a plurality of interest spaces. In step 242, the actions exhibited by a user in the computer network are monitored. In step 244, attention data that is indicative of current user attention and based on the monitored actions is generated. In step 246, user preference data indicative of user interests and the attention data is evaluated. In step 248, the user preference data is adaptively updated in response to changes in user interests. In step 250, user profile data for the user based on the evaluation of the user preference data and the attention data is generated. In step 252, a plurality of interest spaces are defined. Each interest space has an associated predefined interest. In step 254, interest subsets of the user profile data are associated with each corresponding interest space based on the corresponding predefined interests.

Figure 15:
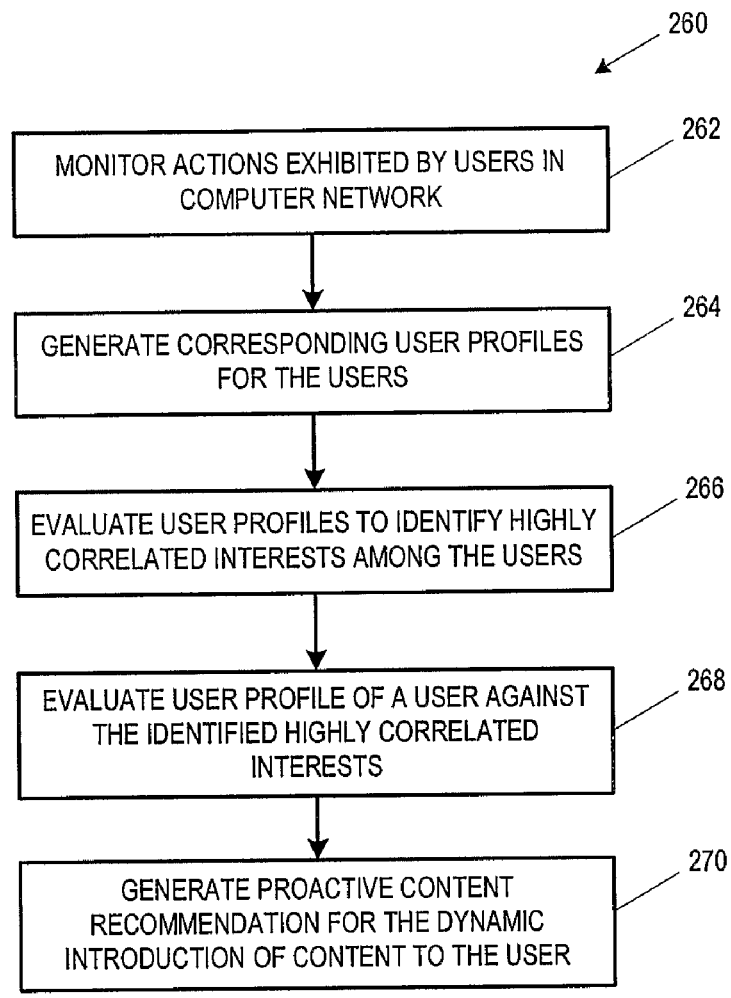
FIG. 15 is a flow diagram for an example process for facilitating user connectivity in a computer network via the proactive content recommendations.

FIG. 15 is an example flow diagram 260 for facilitates user connectivity in a computer network via proactive content recommendations. In step 262, actions indicative of user interests exhibited by a plurality of users in the computer network are monitored. In step 264, corresponding user profiles for the plurality of users based on the monitored actions are generated. In step 266, the user profiles are evaluated to identify highly correlated interests among the plurality of users. In step 268, the user profile of a user is evaluated against the identified highly correlated interests among the plurality of users. In step 270, a proactive content recommendation for the dynamic introduction of content to the user based on the evaluation is generated. Proactive contacts and/or commerce recommendations may also be provided in the same manner.

Figure 16:
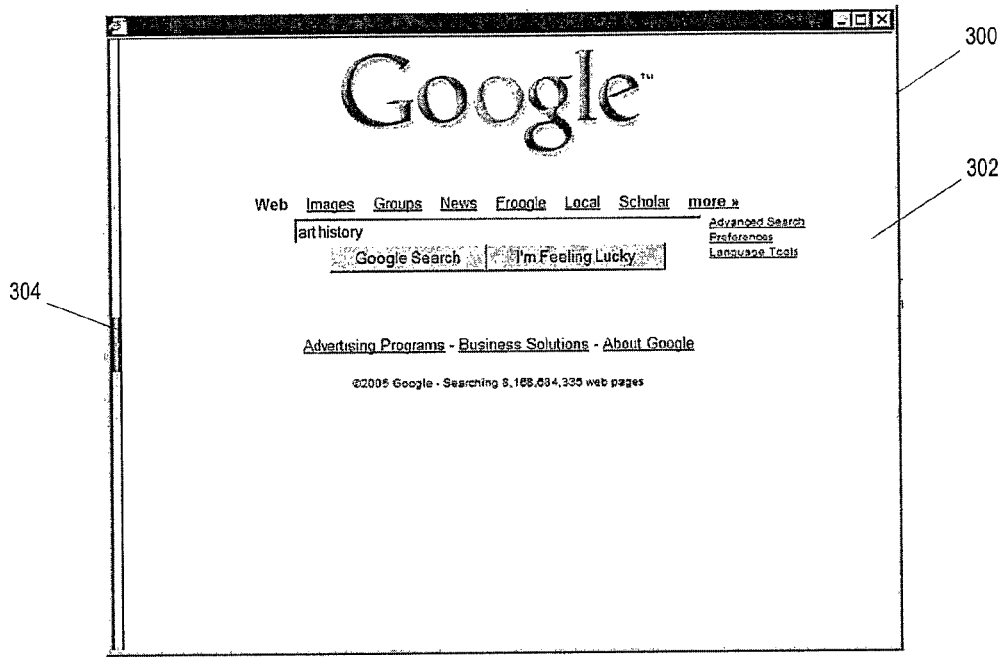

FIGS. 16-22 are example application windows 300 in a computer system that facilitates user connectivity in a computer network. The example application windows 300 depict an extant search engine interface that is augmented with the systems and methods disclosed herein. FIG. 16 depicts an example window 300 having a first frame 302 that comprises an extant environment. Included in the window 300, however, is a frame key 304 that, when selected, generates a frame defining an environment that facilitates connectivity in the computer network.

Figure 17:
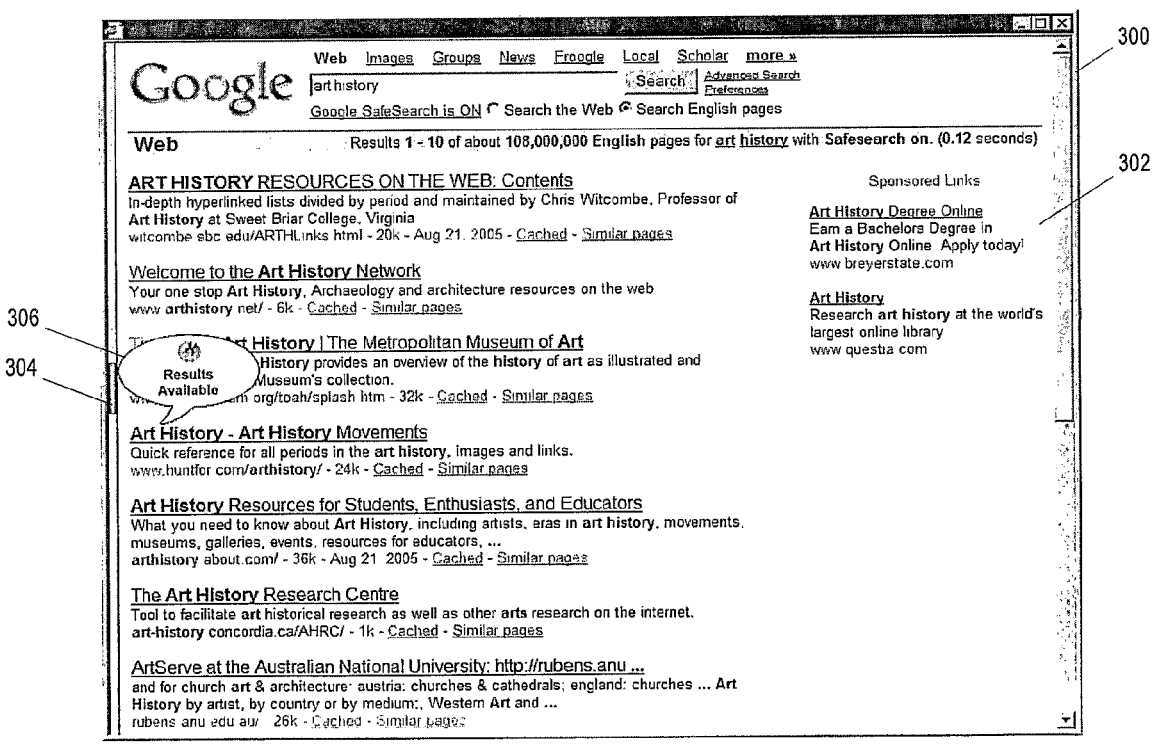

The extant search engine of FIG. 16 may be augmented with the systems and methods herein to conduct searches that are likely to provide results that are of greater interest to the user. Alternatively, the systems and methods disclosed herein may be implemented separately to conduct searches that are likely to provide results that are of greater interest to the user. In either case, the results may be presented to the user by first generating a notification 306 associated with the frame key 304, as shown in FIG. 17. The notification 306 indicates that separate search results are available in addition to the search results provided in the first frame 302.

Figure 18:
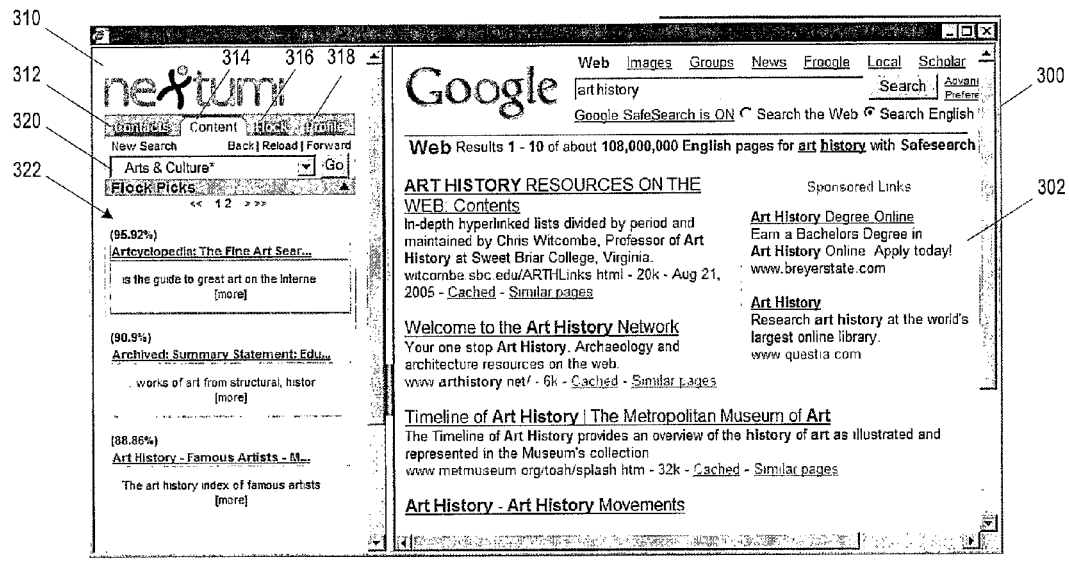

Selecting the frame key 304 generates a second frame 310 within the window 300, as shown in FIG. 18. The second frame 310 defines an environment that facilitates user connectivity in the computer network. The second frame 310 includes a tabular menu having a contacts tab 312, a content tab 314, a flock tab 316, and a profile tab 318. In FIG. 18, the content tab 314 is selected to indicate that a content frame environment is displayed. The menu bar 320 displays the first of one or more searched flocks. As shown in FIG. 18, the flock "Arts & Culture" is displayed in the menu bar 320, indicating that this particular flock was searched from the input search string "art history." Search results are displayed in a results list 322.

Figure 19:
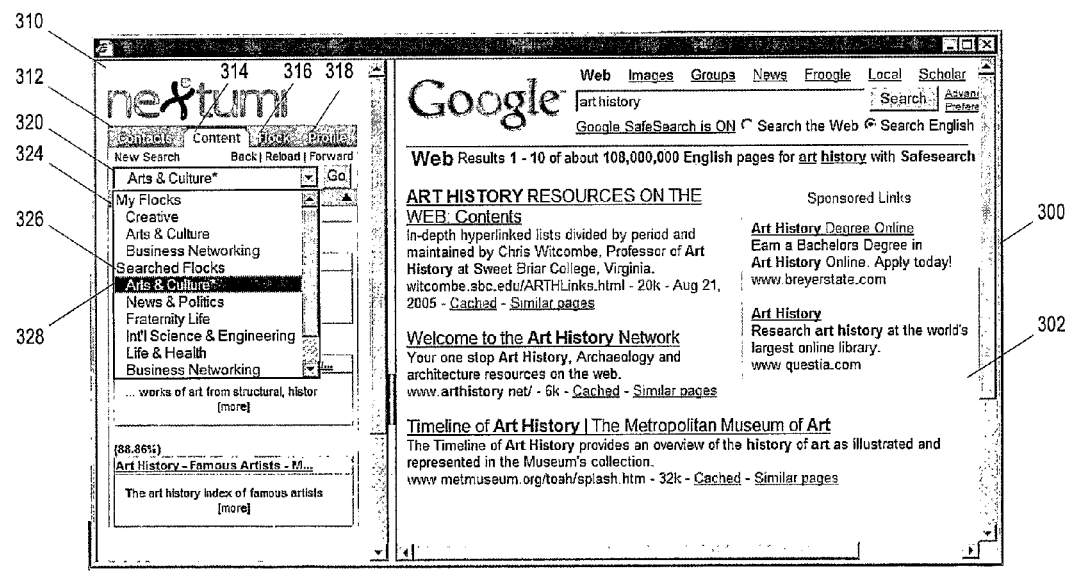

FIG. 18 illustrates that the systems and methods disclosed herein provide a much more manageable list of search results that is likely to include results that are of greater interest to the user. These results are obtained by evaluating user profile against identified highly correlated interests among a plurality of other users and generating a content recommendation, e.g., search results. As illustrated in FIG. 19, the user profile data of the user indicates a strong correlation of common interests in the flocks 324 entitled "Creative," "Arts & Culture," and "Business Networking." Additionally, a list of searched flocks 326 may also be displayed. The menu bar 328 may be used to indicate and select other searched flocks to obtain other search results.

FIG. 20 depicts a profile frame environment associated with the profile tab 318. The frame environment displays information about the user based on the user's profile data. Basic information 330, preference category information 332, and interest information 334 is displayed. The basic information 330 provides basic information about the user, such as an identifier, e-mail address, age, location, etc. The category information 332 comprises the preference categories to which the user belongs. The interest information 334 comprises the areas of interest identified by the user and/or adaptively identified by the attention manager or identity manager. The category information 332 and interest information 334 may be used to identify the flocks to which the user belongs.

FIG. 21 depicts a contact frame environment associated with the contacts tab 312. The contact frame environment may display contacts having identified highly correlated interests with the user. The contacts may be identified from a search for contacts, or may be identified from subject matter search, or may be identified as a result of monitoring the user's activity on the computer network. Common category information 342 and common interest information 344 may be displayed for a first contact 340 if the first contact 340 has defined this information as public information. The displayed common category information 342 and common interest information 344 is a subset of the category information 332 and interest information 334 associated with the identified contact.

An introduction link 346 may be displayed to enable the user to attempt to make an introduction to the first contact 340. The introduction may be made unilaterally, or may be made bilaterally. Additionally, the introduction may also be secure and filtered, as described above.

A list of additional contacts 348 may also be displayed. Information displayed for each additional contact 348 may be similar to the information displayed for the first contact 340.

FIG. 22 depicts a flock frame environment associated with the flock tab 316. The flock frame environment allows a user to select a flock in a flock menu 352 and review flock profile information 354. Flock category information 356, which comprises category information related to a selected flock, may also be displayed. Flocks based on interest information and the user's current attention may also be displayed.

Example embodiments of a novel system and method for facilitating network connectivity have been provided. Variations and additions to these example embodiments may be implemented. In one variation of the embodiments described above, user actions may be monitored and processed independent of the user interacting over a user client 40. For example, a credit card vendor may partner with a connectivity service provider and make available credit cards to users that subscribe to the service of the connectivity service provider. Purchases made by the credit card are then evaluated as are other user actions and the user's profile data is adapted to better reflect the interests, wants and need of the user as a result of the purchase. Thus, if a user uses the credit card to purchase infant formula for an extended period, the connectivity system 30 may adjust the user's profile data to indicate that the user has developed an interest in infant products. Thereafter, proactive contacts, content or commerce data may be provided to the user over the network. For example, commerce data in the form of a downloadable coupon for the brand of infant formula the user purchases may be e-mailed to the user, and content data in the form of a URL to a web page relating to infant nutrition may be proactively added to the user's web page.

The steps and the order of the steps in the methods and flowcharts described herein may be altered, modified and/or augmented and still achieve the desired outcome. Additionally, the methods, flow diagrams and structure block diagrams described in this patent document may be implemented in the example processing devices described herein by program code comprising program instructions that are executable by the device processing subsystem. Other implementations may also be used, however, such as firmware or even appropriately designed hardware configured to carry out the methods and flow diagrams or implement the structure block diagrams described in this patent document. Additionally, the methods, flow diagrams and structure block diagrams described in this patent document that describe particular methods and/or corresponding acts in support of steps and corresponding functions in support of disclosed software structures may also be implemented in software stored in a computer readable medium, and equivalents thereof. The software structures may comprise source code, object code, machine code, or any other persistently or temporarily stored data that is operable to cause one or more processing systems to perform the methods described herein or realize the structures described herein.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A computer system for facilitating user connectivity in a computer network, comprising:

an attention manager configured to monitor actions exhibited by a first user in the computer network and to generate attention data that is indicative of current user attention, the attention data based on the monitored actions exhibited by the first user;

an identity manager configured to generate and evaluate user preference data indicative of user interests and the attention data and generate user profile data for the first user based on the user preference data and the attention data, the user profile data indicative of user interests, and further configured to adaptively update the user preference data in response to changes in user interests; and an introduction manager configured to receive the user profile data of the first user and user profile data related to a plurality of other users and evaluate the user profile data of the first user and the user profile data related to the plurality of other users, the profile data of each respective user in the plurality of other users indicative of user interests and further configured to adaptively update the user preference data in response to changes in user interests of the respective user, and provide a bilaterally secure introduction between the first user and with one or more other users based on the evaluation;

wherein the identity manager comprises:

a user profiler configured to receive the user preference data indicative of user interests and further configured to receive adaptive definition data defining adaptive preferences and source definition data defining adaptive preference sources; and a preference adapter configured to modify the user preference data of the adaptive preferences based on a monitoring of the adaptive preference sources to adaptively update the user preference data in response to changes in user interests;

and wherein the introduction manager comprises:
  a match engine configured to receive user profile data defined as public user profile data and to evaluate the public user profile data of the first user and the public user profile data related to the plurality of other users; and
  a bilateral introduction manager configured to provide the bilaterally secure introduction between the first user and one or more other users.

2. The system of claim 1, wherein the attention data comprises mask data configured to mask select portions of the user preference data, the select portions based on the current user attention.

3. The system of claim 2, wherein the mask data comprises weighted data.

4. The system of claim 1, wherein the attention manager comprises:
  a recent history monitor configured to monitor user actions in the computer network over a predefined measurement criterion, the user actions including click interactions and uniform resource locator (URL) interactions; and
  a natural language monitor configured to monitor natural language data input by the user over the predefined measurement criterion;
  wherein the attention manager generates the attention data based on the click interactions, URL interactions, and the natural language data input.

5. The system of claim 4, wherein the predefined measurement criterion is a predefined time period.

6. The system of claim 4, wherein the predefined measurement criterion is an interaction session.

7. The system of claim 1, wherein the user profiler is further configured to receive public definition data defining public user profile data, and wherein the public user profile data are accessible by third parties.

8. The system of claim 7, wherein the user profile data of the first user and user profile data related to other users received by the introduction manager comprises public user profile data.

9. The system of claim 1, wherein adaptive preference sources comprise data stored on a client computer associated with the first user.

10. The system of claim 1, wherein the bilaterally secure introduction comprises a bilaterally secure product offer.

11. The system of claim 1, wherein the user profile data comprises a consumer chromosome data structure, and wherein the introduction manager utilizes a genetic algorithm to evaluate the user profile data of the first user and the user profile data related to the plurality of other users and provide a bilaterally secure introduction between the first user and one or more other users.

12. The system of claim 1, wherein the profile data is further indicative of user behavior.

13. The system of claim 12, wherein the user behavior comprises a behavior based on click interactions.

14. A computer implemented method of facilitating user connectivity in a computer network, comprising:
  monitoring actions exhibited by a first user in the computer network;
  generating attention data based on the monitored actions, the attention data indicative of current user attention of the first user;
  evaluating user preference data indicative of user interests and the attention data of the first user;
  generating user profile data for the first user based on the user preference data and the attention data of the first user, the user profile data indicative of user interests;
  adaptively updating the user preference data in response to changes in user interests of the first user;
  evaluating the user profile data of the first user and user profile data related to a plurality of other users, the profile data of each respective user in the plurality of other users indicative of user interests and further configured to adaptively update the user preference data in response to changes in user interests of the respective user; and
  providing a bilaterally secure introduction between the first user and one or more other users based on the evaluation of the user profile data of the first user and user profile data related to the plurality of other users.

15. The method of claim 14, wherein generating attention data based on the monitored behavior that is indicative of current user attention comprises generating mask data configured to mask select portions of the user preference data, the select portions based on the current user attention.

16. The method of claim 15, wherein the mask data comprises weighted data.

17. The method of claim 14, wherein monitoring actions exhibited by the first user in the computer network comprises:
  monitoring user interactions in the computer network over a predefined measurement criterion; and
  monitoring natural language data input by the user over the predefined measurement criterion.

18. The method of claim 17, wherein monitoring user interactions comprising monitoring click interactions and uniform resource locator (URL) interactions.

19. The method of claim 18, wherein the predefined measurement criterion is a predefined time period.

20. The method of claim 14, wherein adaptively updating the user preference data in response to changes in user interests comprises:
  defining adaptive preferences;
  defining adaptive preference sources; and
  modifying the user preference data of the adaptive preferences based on a monitoring of the adaptive preference sources.

21. The method of claim 20, further comprising:
  defining public user profile data accessible by third parties;
  wherein evaluating the user profile data of the first user and user profile data related to other users comprises evaluating the public user profile data of the first user and the public user profile data related to other users.

22. A computer system for facilitating the providing of content to one or more users in a computer network, comprising:
  an identity manager configured to monitor actions indicative of user interests exhibited by a plurality of users in the computer network and to generate corresponding user profiles for the plurality of users based on the evaluation of the monitored actions, the user profiles indicative of user interests for the plurality of users, and further configured to evaluate the user profiles to identify highly correlated interests among the plurality of users;
  an introduction manager configured to receive a first user profile of a first user and evaluate the user profile against the identified highly correlated interests among the plurality of users and generate a proactive contact, content, or commerce data recommendation for the dynamic introduction of contact, content, or commerce data to the first user based on the evaluation;
  a content server configured to receive the proactive contact, content, or commerce data recommendation and provide the dynamic introduction of contact, content, or commerce data to the first user in response to the contact, content, or commerce data recommendation; and an attention manager configured to monitor actions exhibited by the first user in the computer network and to generate attention data that is indicative of current user attention, the attention data based on the monitored actions exhibited by the first user;

wherein the identity manager is further configured to modify the corresponding user profile of the first user based on the attention data, and wherein the user profiles comprise consumer chromosome data structures, and wherein the introduction manager utilizes a genetic algorithm to identify highly correlated interests among the plurality of users.

23. The system of claim 22, wherein the attention data comprises mask data configured to mask select portions of the corresponding user profile of the user, the select portions based on the current user attention.

24. The system of claim 22, wherein the attention manager comprises:
 a recent history monitor configured to monitor user interactions in the computer network over a predefined measurement criterion, the user interactions including click interactions and uniform resource locator (URL) interactions; and
 a natural language monitor configured to monitor natural language data input by the user over the predefined measurement criterion;
 wherein the attention manager generates the attention data based on the click interactions, URL interactions, and the natural language data input.

25. The system of claim 24, wherein the predefined measurement criterion is an interaction session.

26. The system of claim 22, wherein the identity manager comprises:
 a user profiler configured to receive user preference data indicative of user interests and further configured to receive adaptive definition data defining adaptive preferences and source definition data defining adaptive preference sources and generate a corresponding user profile based on the user preference data and the adaptive preference sources; and
 a preference adapter configured to modify the user preference data of the adaptive preferences based on a monitoring of the adaptive preference sources to adaptively update the user preference data in response to changes in user interests.

27. The system of claim 26, wherein the user profiler is further configured to receive public definition data defining public user profile data, and wherein the user profile received by the introduction manager comprises the public user profile data.

28. The system of claim 26, wherein adaptive preference sources comprise data stored on a client computer associated with the user.

29. The system of claim 22, wherein the proactive content data comprises a web page proactively generated based on the profile data.

30. The system of claim 22, wherein the proactive commerce data comprises a product Uniform Resource Locator (URL).

31. The system of claim 22, wherein the profile data is further indicative of user behavior.

32. The system of claim 31, wherein the user behavior comprises a behavior based on click interactions.

33. A computer system for facilitating user connectivity in a computer network, comprising:

an attention manager configured to monitor actions exhibited by a first user in the computer network and to generate attention data that is indicative of current user attention, the attention data based on the monitored actions exhibited by the first user;

an identity manager configured to evaluate user preference data indicative of user interests and the attention data and generate user profile data for the first user based on the user preference data and the attention data of the first user, the user profile data indicative of user interests, and further configured to adaptively update the user preference data in response to changes in user interests of the first user; and;

a plurality of interest space managers, each respective interest space manager in the plurality of interest space managers configured to receive the user profile data for a plurality of other users and access interest subsets of the user profile data, the access to the interest subsets for each interest space manager based on a predefined interest associated with the interest space manager;

wherein each respective interest space manager in the plurality of interest space managers is further configured to evaluate the accessed interest subsets of the user profile data to identify potential common interests between two or more users, wherein each respective interest space manager in the plurality of interest space managers comprises an introduction manager configured to receive the interest subset of the user profile data for the first user and evaluate the interest subset against highly correlated interests indicia for the plurality of other users and provide a bilaterally secure introduction between the first user and one or more other users based on the evaluation.

34. The system of claim 33, wherein the predefined interests comprise one of a business interest, consumer interest, or personal interest.

35. The system of claim 33, wherein each interest space manager comprises an interest mask that defines the subset of the user profile data accessible by the interest space manager.

36. The system of claim 33, wherein each interest space manager comprises a content server.

37. The system of claim 33, wherein each interest space manager comprises an introduction manager configured to receive the interest subset of the user profile data for the first user and evaluate the interest subset against highly correlated interests indicia for the plurality of other users and generate proactive contact, content, or commerce data recommendations for the dynamic introduction of contact, content, or commerce data to the user based on the evaluation.

38. The system of claim 33, wherein the attention data comprises mask data configured to mask select portions of the user preference data, the select portions based on the current user attention.

39. The system of claim 38, wherein the mask data comprises weighted data.

40. The system of claim 33, wherein the attention manager comprises:
 a recent history monitor configured to monitor user interactions in the computer network over a predefined measurement criterion, the user interactions including click interactions and uniform resource locator (URL) interactions; and
 a natural language monitor configured to monitor natural language data input by the first user over the predefined measurement criterion;
 wherein the attention manager generates the attention data based on the monitored actions exhibited by the first user based on the click interactions, URL interactions, and the natural language data input.

41. The system of claim 40, wherein the predefined measurement criterion is a predefined time period.

42. The system of claim 33, wherein the identity manager comprises:
    a user profiler configured to receive the user preference data indicative of user interests of the first user and further configured to receive adaptive definition data defining adaptive preferences and source definition data defining adaptive preference sources; and
    a preference adapter configured to modify the user preference data of the adaptive preferences based on a monitoring of the adaptive preference sources to adaptively update the user preference data of the first user in response to changes in user interests of the first user.

43. A computer-implemented method of facilitating user connectivity in a computer network, comprising:
    monitoring actions exhibited by a first user in the computer network;
    generating attention data that is indicative of current user attention of the first user, the attention data based on the monitored actions exhibited by the first user;
    evaluating user preference data indicative of user interests and the attention data of the first user;
    generating user profile data indicative of user interests of the first user based on the user preference data and the attention data, the user profile data indicative of user interests of the first user;
    adaptively updating the user preference data in response to changes in user interests of the first user;
    defining a plurality of interest spaces;
    associating a corresponding predefined interest with each interest space in the plurality of interest spaces;
    associating interest subsets of the user profile data with each corresponding interest space in the plurality of interest spaces based on the corresponding predefined interests;
    evaluating the interest subsets of the user profile data to identify potential common interests between two or more users,
    evaluating the interest subset of user profile data against highly correlated interests indicia for a plurality of other users; and
    providing a bilaterally secure introduction between two or more other users based on the evaluation.

44. The method of claim 43, wherein the predefined interests comprise one of a business interest, consumer interest, or personal interest.

45. The method of claim 43, further comprising limiting access of each interest space to the corresponding interest subset of the user profile data.

46. The method of claim 43, further comprising:
    evaluating the interest subset of user profile data against highly correlated interests indicia for a plurality of other users; and
    generating proactive contact, content, or commerce data recommendations for the dynamic introduction of contact, content, or commerce data to the user based on the evaluation.

47. The method of claim 43, wherein monitoring actions exhibited by a user in the computer network comprises:
    monitoring actions exhibited by a first user in the computer network over a predefined measurement criterion; and
    monitoring natural language data input by the user over the predefined measurement criterion.

48. The method of claim 46, wherein the measurement criterion is a browser interaction session.

\* \* \* \* \*